United States Patent
Yamamoto et al.

(10) Patent No.: US 7,206,484 B2
(45) Date of Patent: Apr. 17, 2007

(54) OPTICAL FIBER, DISPERSION COMPENSATOR, AND OPTICAL TRANSMISSION SYSTEM

(75) Inventors: Yoshinori Yamamoto, Yokohama (JP); Takatoshi Kato, Yokohama (JP); Takashi Fujii, Yokohama (JP); Tomoyuki Yokokawa, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 314 days.

(21) Appl. No.: 10/347,417

(22) Filed: Jan. 21, 2003

(65) Prior Publication Data
US 2004/0001681 A1   Jan. 1, 2004

(30) Foreign Application Priority Data
Jul. 1, 2002   (JP) ............... P2002-192409
Nov. 20, 2002  (JP) ............... 2002-337010

(51) Int. Cl.
*G02B 6/036* (2006.01)
(52) U.S. Cl. ............... 385/123; 385/127; 385/128
(58) Field of Classification Search ........ 385/123–128, 385/134, 136
See application file for complete search history.

(56) References Cited

U.S. PATENT DOCUMENTS

| | | | |
|---|---|---|---|
| 4,998,003 A | 3/1991 | Kawanabe | |
| 5,361,319 A | 11/1994 | Antos et al. | |
| 5,448,674 A | 9/1995 | Vengsarkar et al. | |
| 5,742,723 A * | 4/1998 | Onishi et al. | 385/127 |
| 5,887,104 A * | 3/1999 | Sugizaki et al. | 385/123 |
| 5,999,679 A | 12/1999 | Antos et al. | |
| 6,349,163 B1 | 2/2002 | Antos et al. | |

(Continued)

FOREIGN PATENT DOCUMENTS

EP   1 063 542 A1   12/2000

(Continued)

OTHER PUBLICATIONS

D.W. Hawtof et al., "High Figure of Merit Dispersion Compensating Fiber", OFC '96, Postdeadline Paper 10, Corning, Incorporated, Science and Technology Division, pp. 1-9.

(Continued)

*Primary Examiner*—Sung Pak
*Assistant Examiner*—Omar Rojas
(74) *Attorney, Agent, or Firm*—McDermott Will & Emery LLP

(57) ABSTRACT

The present invention relates to a compact dispersion compensator and the like. The dispersion compensator comprises a housing and an optical fiber coil. The optical fiber coil has a coiled part constituted by a dispersion-compensating optical fiber wound like a coil while being in a bundle state with its winding distortion substantially eliminated. The housing is filled with a resin surrounding the coiled part of the optical fiber coil, whereas the coiled part is held by the resin. The dispersion-compensating optical fiber constituting the optical fiber coil has a chromatic dispersion of −140 ps/nm/km or less at a wavelength of 1.55 μm, whereas the housing has a volume of 500 $cm^3$ or less. This configuration allows the dispersion compensator to attain an accumulated chromatic dispersion of −1200 ps/nm/km or more but less than −600 ps/nm at a wavelength of 1.55 μm.

59 Claims, 21 Drawing Sheets

| FIBER TYPE | Δ1 (%) | Δ2 (%) | Δ3 (%) | 2a (μm) | 2b (μm) | 2c (μm) | CHROMATIC DISPERSION (ps/nm/km) | DISPERSION SLOPE (ps/nm2/km) | EFFECTIVE CUTOFF WAVELENGTH (μm) | MFD (μm) | BENDING LOSS (dB/km) AT DIAMETER OF 40mm | BENDING LOSS (dB/km) AT DIAMETER OF 60mm |
|---|---|---|---|---|---|---|---|---|---|---|---|---|
| No.1 | 3.0 | -0.35 | | 2.5 | 6.2 | | -147 | -0.120 | 0.71 | 4.3 | 8.69 | 0.02 |
| No.2 | 2.4 | -0.72 | 0.30 | 3.4 | 7.4 | 15.4 | -242 | -0.655 | 1.65 | 4.5 | 0.06 | <0.001 |
| No.3 | 3.0 | -0.72 | 0.30 | 2.8 | 7.0 | 14.0 | -320 | -0.595 | 1.47 | 4.2 | 0.44 | <0.001 |

U.S. PATENT DOCUMENTS

| | | | |
|---|---|---|---|
| 6,400,877 B1 | 6/2002 | Kato et al. | |
| 6,404,967 B2 | 6/2002 | Arai et al. | |
| 6,490,398 B2 * | 12/2002 | Gruner-Nielsen et al. | 385/123 |
| 6,650,814 B2 * | 11/2003 | Caplen et al. | 385/127 |
| 6,711,332 B2 * | 3/2004 | Hebgen et al. | 385/124 |
| 6,751,390 B2 * | 6/2004 | Qi et al. | 385/127 |
| 2002/0012147 A1 * | 1/2002 | Hazell et al. | 359/161 |

FOREIGN PATENT DOCUMENTS

| | | |
|---|---|---|
| EP | 1 122 562 A1 | 8/2001 |
| EP | 1 130 428 A1 | 9/2001 |
| JP | 10-115727 | 5/1998 |
| JP | 10-123342 | 5/1998 |
| JP | 10-319266 | 12/1998 |
| JP | 2002-71995 | 3/2002 |

OTHER PUBLICATIONS

Rightwave Microdk Dispersion Compensating Module, Press Release, OFS Introduces New Microtechnology Speciality Photonics Products, OFC, Booth 2141, Atlanta, GA, Mar. 25, 2003.

USPTO Office Action Issued on Jul. 21, 2006, for related U.S. Appl. No. 10/613,999, filed Jul. 8, 2003.

* cited by examiner

Fig.7

| FIBER TYPE | Δ1 (%) | Δ2 (%) | Δ3 (%) | 2a (μm) | 2b (μm) | 2c (μm) | CHROMATIC DISPERSION (ps/nm/km) | DISPERSION SLOPE (ps/nm2/km) | EFFECTIVE CUTOFF WAVELENGTH (μm) | MFD (μm) | BENDING LOSS (dB/km) AT DIAMETER OF 40mm | BENDING LOSS (dB/km) AT DIAMETER OF 60mm |
|---|---|---|---|---|---|---|---|---|---|---|---|---|
| No.1 | 3.0 | -0.35 | / | 2.5 | 6.2 | / | -147 | -0.120 | 0.71 | 4.3 | 8.69 | 0.02 |
| No.2 | 2.4 | -0.72 | 0.30 | 3.4 | 7.4 | 15.4 | -242 | -0.655 | 1.65 | 4.5 | 0.06 | <0.001 |
| No.3 | 3.0 | -0.72 | 0.30 | 2.8 | 7.0 | 14.0 | -320 | -0.595 | 1.47 | 4.2 | 0.44 | <0.001 |

Fig.10

| SAMPLE No | FIBER TYPE | FIBER LENGTH (km) | GLASS DIAMETER (μm) | COAT DIAMETER (μm) | ACCUMULATED CHROMATIC DISPERSION (ps/nm) | TOTAL DISPERSION SLOPE (ps/nm²) | INSERTION LOSS (dB) | BOBBIN DIAMETER (mm) | COIL OUTER DIAMETER (mm) | COIL WIDTH (mm) | LONG L (mm) | WIDE W (mm) | HIGH H (mm) | VOLUME (cm³) | FIBER STORAGE CONDITION |
|---|---|---|---|---|---|---|---|---|---|---|---|---|---|---|---|
| 1 | No.1 | 2.05 | 80 | 120 | -300 | -0.25 | 3.5 | 58 | 82 | 12 | 102 | 102 | 17 | 177 | RESIN MOLDED |
| 2 | No.1 | 4.09 | 80 | 120 | -600 | -0.49 | 5.2 | 58 | 101 | 12 | 121 | 121 | 17 | 249 | RESIN MOLDED |
| 3 | No.1 | 2.05 | 90 | 145 | -300 | -0.25 | 3.5 | 58 | 91 | 12 | 111 | 111 | 17 | 209 | RESIN MOLDED |
| 4 | No.1 | 4.09 | 90 | 145 | -600 | -0.49 | 5.2 | 58 | 115 | 12 | 135 | 135 | 17 | 310 | RESIN MOLDED |
| 5 | No.2 | 0.33 | 125 | 185 | -80 | -0.22 | 2.2 | 40 | 54 | 12 | 74 | 74 | 17 | 93 | RESIN MOLDED |
| 6 | No.2 | 0.74 | 125 | 185 | -180 | -0.49 | 2.5 | 40 | 68 | 12 | 88 | 88 | 17 | 132 | RESIN MOLDED |
| 7 | No.2 | 1.24 | 125 | 185 | -300 | -0.81 | 2.9 | 40 | 81 | 12 | 101 | 101 | 17 | 173 | RESIN MOLDED |
| 8 | No.2 | 2.48 | 125 | 185 | -600 | -1.63 | 3.9 | 50 | 111 | 12 | 131 | 131 | 17 | 292 | RESIN MOLDED |
| 9 | No.2 | 4.97 | 125 | 185 | -1200 | -3.25 | 5.9 | 50 | 150 | 12 | 170 | 170 | 17 | 491 | RESIN MOLDED |
| 10 | No.3 | 0.25 | 125 | 185 | -80 | -0.15 | 2.1 | 40 | 51 | 12 | 71 | 71 | 17 | 86 | RESIN MOLDED |
| 11 | No.3 | 0.56 | 125 | 185 | -180 | -0.34 | 2.4 | 40 | 62 | 12 | 82 | 82 | 17 | 114 | RESIN MOLDED |
| 12 | No.3 | 0.94 | 125 | 185 | -300 | -0.56 | 2.7 | 40 | 73 | 12 | 93 | 93 | 17 | 147 | RESIN MOLDED |
| 13 | No.3 | 1.88 | 125 | 185 | -600 | -1.12 | 3.4 | 50 | 100 | 12 | 120 | 120 | 17 | 245 | RESIN MOLDED |
| 14 | No.3 | 3.76 | 125 | 185 | -1200 | -2.23 | 4.9 | 50 | 132 | 12 | 152 | 152 | 17 | 393 | RESIN MOLDED |
| 15 | No.3 | 3.76 | 90 | 145 | -1200 | -2.23 | 4.9 | 40 | 104 | 12 | 124 | 124 | 17 | 261 | RESIN MOLDED |
| 16 | No.3 | 3.76 | 90 | 145 | -1200 | -2.23 | 4.9 | 40 | 153 | 5 | 173 | 173 | 10 | 299 | RESIN MOLDED |
| 17 | No.3 | 0.25 | 125 | 185 | -80 | -0.15 | 2.1 | 40 | 56 | 5 | 76 | 76 | 10 | 58 | RESIN MOLDED |

Fig.14

| FIBER TYPE | Δ1 (%) | Δ2 (%) | Δ3 (%) | Ra | Rb | 2C (μm) | CHROMATIC DISPERSION (ps/nm/km) | DISPERSION SLOPE (ps/nm²/km) | CUTOFF WAVELENGTH (μm) | Aeff (μm²) | MAIXIMUM CHANGE(%) OF CHROMATIC DISPERSION AT ±2% FLUCTUATION |
|---|---|---|---|---|---|---|---|---|---|---|---|
| No.4 | 2.4 | -0.6 | 0.6 | 0.30 | 0.7 | 11.1 | -158 | -0.193 | 1.372 | 16.4 | 8.6 |
| No.5 | 2.4 | -0.7 | 0.6 | 0.33 | 0.7 | 10.0 | -165 | 0.117 | 1.218 | 19.4 | 4.2 |
| No.6 | 2.7 | -0.5 | 0.6 | 0.26 | 0.7 | 11.4 | -184 | -0.197 | 1.438 | 15.7 | 8.2 |
| No.7 | 2.7 | -0.7 | 0.6 | 0.30 | 0.7 | 10.0 | -206 | 0.091 | 1.216 | 17.9 | 5.2 |
| No.8 | 3.0 | -0.5 | 0.6 | 0.24 | 0.7 | 11.1 | -230 | 0.120 | 1.400 | 17.5 | 4.7 |
| No.9 | 3.0 | -0.7 | 0.6 | 0.26 | 0.7 | 10.7 | -267 | -0.378 | 1.295 | 15.2 | 10.3 |
| No.10 | 3.1 | -0.74 | 0.32 | 0.19 | 0.44 | 14.7 | -321 | -0.132 | 1.706 | 16.6 | 10.8 |

OPTICAL FIBER, DISPERSION COMPENSATOR, AND OPTICAL TRANSMISSION SYSTEM

BACKGROUND OF THE INVENTION

1. Field of the Invention

The present invention relates to an optical fiber which can compensate for dispersion, a dispersion compensator, and an optical transmission system including the dispersion compensator.

2. Related Background Art

Conventionally, dispersion compensators for compensating for chromatic dispersion of signal light occurring in optical fiber transmission lines have a typical housing size of 230 mm×230 mm×40 mm, thus occupying a very large volume in optical transmission systems. This results from the fact that it is necessary for main line long-haul, large-volume transmission systems to compensate for large chromatic dispersion, whereby a dispersion-compensating optical fiber employed for a dispersion compensator may have a length of ten-odd kilometers, whereas it is also important to control the dispersion slope for compensating for chromatic dispersion over a wide band, and so forth. For example, Japanese Patent Application Laid-Open No. HEI 10-123342 uses a dispersion-compensating optical fiber having a chromatic dispersion of −100 ps/nm/km as a characteristic at a wavelength of 1.55 μm.

SUMMARY OF THE INVENTION

The inventors studied the conventional technique mentioned above and, as a result, have found the following problem.

Namely, though the above-mentioned Japanese Patent Application Laid-Open No. HEI 10-123342 attempts to increase the absolute value of chromatic dispersion while compensating for dispersion slope, the absolute value of chromatic dispersion is only about 100 ps/nm/km, so that the fiber length increases as mentioned above in order to compensate for chromatic dispersion having a large absolute value. Also, the dispersion-compensating optical fiber becomes more susceptible to bending (thus increasing its bending loss), whereby a small distortion tends to increase the transmission loss on the longer wavelength side. Therefore, making the winding diameter of the dispersion-compensating optical fiber smaller so as to reduce the size of a dispersion compensator (a case for accommodating the same) increases the transmission loss.

However, it is not necessary for a system carrying out optical transmissions over a relatively short distance to take account of the dispersion slope compensation mentioned above. Therefore, unless the dispersion slope compensation is taken into consideration, a dispersion-compensating optical fiber having a relatively large absolute value of chromatic dispersion can be employed as well. Though Japanese Patent Application Laid-Open No. HEI 10-115727 discloses a compacting technique by thinning the diameter of dispersion-compensating optical fiber, this technique does not pay attention to optical characteristics (the absolute value of chromatic dispersion in particular) of the dispersion-compensating optical fiber. The above-mentioned conventional technique has such a large dispersion slope that chromatic dispersion greatly varies among signal channels in use, chromatic dispersion on the same order can be obtained over a wider wavelength band when the dispersion slope is made smaller (fluctuations in the dispersion value can be lowered over a wider wave length band).

In order to overcome the problem mentioned above, it is an object of the present invention to provide a compact dispersion compensator, an optical transmission system including the same, and an optical fiber for realizing a further compactness in the dispersion compensator.

For achieving the above-mentioned object, the dispersion compensator according to the present invention comprises a dispersion-compensating optical fiber and a housing for accommodating the dispersion-compensating optical fiber.

For realizing an accumulated chromatic dispersion of −1200 ps/nm or more but less than −600 ps/nm as a dispersion characteristic at a wavelength of 1.55 μm in the dispersion compensator according to the present invention, the dispersion-compensating optical fiber has a chromatic dispersion of −140 ps/nm/km or less at a wavelength of 1.55 μm, whereas the housing has a volume of 500 cm$^3$ or less. Preferably, the housing has an outer size (long×wide×high) of 170 mm or less×170 mm or less×17 mm or less.

For realizing an accumulated chromatic dispersion of −600 ps/nm or more but less than 0 ps/nm as a dispersion characteristic at a wavelength of 1.55 μm in the dispersion compensator according to the present invention, the dispersion-compensating optical fiber has a chromatic dispersion of −140 ps/nm/km or less at a wavelength of 1.55 μm, whereas the housing has a volume of 310 cm$^3$ or less. Preferably, in this case, the housing has an outer size (long×wide×high) of 130 mm or less×130 mm or less×17 mm or less.

For realizing an accumulated chromatic dispersion of −300 ps/nm or more but less than 0 ps/nm as a dispersion characteristic at a wavelength of 1.55 μm in the dispersion compensator according to the present invention, the dispersion-compensating optical fiber has a chromatic dispersion of −140 ps/nm/km or less at a wavelength of 1.55 μm, whereas the housing has a volume of 260 cm$^3$ or less. Preferably, in this case, the housing has an outer size (long×wide×high) of 120 mm or less×120 mm or less×18 mm or less.

For realizing an accumulated chromatic dispersion of −180 ps/nm or more but less than 0 ps/nm as a dispersion characteristic at a wavelength of 1.55 μm in the dispersion compensator according to the present invention, the dispersion-compensating optical fiber has a chromatic dispersion of −140 ps/nm/km or less at a wavelength of 1.55 μm, whereas the housing has a volume of 200 cm$^3$ or less. Preferably, in this case, the housing has an outer size (long×wide×high) of 100 mm or less×100 mm or less×18 mm or less.

For realizing an accumulated chromatic dispersion of −80 ps/nm or more but less than 0 ps/nm as a dispersion characteristic at a wavelength of 1.55 μm in the dispersion compensator according to the present invention, the dispersion-compensating optical fiber has a chromatic dispersion of −140 ps/nm/km or less at a wavelength of 1.55 μm, whereas the housing has a volume of 140 cm$^3$ or less. Preferably, in this case, the housing has an outer size (long×wide×high) of 100 mm or less×100 mm or less×14 mm or less.

In view of the environment in which the dispersion compensator is placed and the like, the housing has a height of preferably 10 mm or less, more preferably 6 mm or less.

Preferably, the dispersion-compensating optical fiber comprises a core region extending along a predetermined axis, a cladding region provided on an outer periphery of the core region, and a coating layer constituted by a single layer or a plurality of layers provided on an outer periphery of the cladding region, whereas the coating layer has an outer diameter of 185 µm or less, preferably 145 µm or less, more preferably 125 µm or less.

Preferably, for making it possible to be stored at a smaller diameter and shorten the length, the dispersion-compensating optical fiber has a chromatic dispersion of −220 ps/nm/km or less at a wavelength of 1.55 µm. Preferably, in this case, the dispersion-compensating optical fiber is wound like a coil, and is accommodated in the housing while maintaining this coil form. Preferably, the dispersion-compensating optical fiber maintains the coil form with the aid of a resin.

For making the dispersion compensator compact, the dispersion-compensating optical fiber wound within the housing has a winding inner diameter of preferably 60 mm or less, more preferably 50 mm or less.

A dispersion compensator having the structure mentioned above (dispersion compensator according to the present invention) can be employed in an optical transmission system such as a wavelength division multiplexing system for transmitting a plurality of channels of signal light having wavelengths different from each other. Such an optical transmission system (optical transmission system according to the present invention) comprises a transmitter for transmitting signal light, a transmission optical fiber through which multiplexed signal light propagates, the above-mentioned dispersion compensator, and a receiver for receiving the signal light. The optical transmission system according to the present invention is effective for optical communications in the band of 1.55 µm, particularly in the case where the length of the transmission optical fiber (the span length corresponding to a repeating section) is 50 km or less.

The dispersion compensator having the structure mentioned above can attain a further compactness when an optical fiber such as a dispersion-compensating optical fiber employed therein is designed so as to be able to have a smaller diameter and a shorter length.

Specifically, the optical fiber according to the present invention has, as characteristics at a wavelength of 1550 nm, a chromatic dispersion of −150 ps/nm/km or less, preferably −200 ps/nm/km or less, a bending loss of 0.1 dB/km or less, preferably 0.01 dB/km or less, in a state wound at a diameter of 60 mm. In this case, the optical fiber preferably has a dispersion slope with an absolute value of 0.4 ps/nm²/km or less as a characteristic at a wavelength of 1550 nm, and preferably has an effective area of 20 µm² or less as a characteristic at a wavelength of 1550 nm.

The optical fiber according to the present invention may have, as characteristics at a wavelength of 1550 nm, a chromatic dispersion of −150 ps/nm/km or less, preferably −200 ps/nm/km or less, a dispersion loss with an absolute value of 0.4 ps/nm²/km or less, and an effective area of 20 µm² or less. In this case, the optical fiber may have, as characteristics at a wavelength of 1550 nm, a bending loss of 0.1 dB/km or less, preferably 0.01 dB/km or less, in a state wound at a diameter of 60 mm.

The optical fiber according to the present invention has, as a characteristic at a wavelength of 1550 nm, a bending loss of 0.1 dB/km or less, preferably 0.01 dB/km or less, in a state wound at a diameter of 40 mm. The optical fiber according to the present invention has a cutoff wavelength of 1.2 µm to 2.0 µm, preferably 1.4 µm to 2.0 µm, more preferably 1.55 µm to 2.0 µm.

Preferably, the optical fiber according to the present invention has a triple cladding type refractive index profile in order to allow it to make the dispersion compensator sufficiently compact when employed therein.

Specifically, the optical fiber according to this aspect of the present invention comprises a center core part extending along a predetermined axis and having a predetermined maximum refractive index; a first cladding part, provided on an outer periphery of the center core part, having a refractive index lower than that of the center core part; a second cladding part, provided on an outer periphery of the first cladding part, having a refractive index higher than that of the first cladding part; and a third cladding part, provided on an outer periphery of the second cladding part, having a refractive index lower than that of the second cladding part.

Preferably, the center core part has a relative refractive index difference of 2.0% to 4.0% with reference to the refractive index of the third cladding part, and the first cladding part has a relative refractive index difference of −0.9% to −0.2% with reference to the refractive index of the third cladding part. Preferably, the second cladding part has a relative refractive index difference of 0.2% to 0.9% with reference to the refractive index of the third cladding part, and the optical fiber satisfies the following conditions:

$$0.2 \leq a/c < 0.4, \text{ and}$$

$$0.4 \leq b/c \leq 0.8$$

where a is the outer radius of the center core region, b is the outer radius of the first cladding part, and c is the outer radius of the second cladding part.

When the outer diameter of the second cladding part changes by ±2%, the change in chromatic dispersion of the optical fiber according to the present invention at a wavelength of 1550 nm is preferably ±12% or less, more preferably ±6% or less.

A dispersion compensator having an accumulated chromatic dispersion of −390 to 0 ps/nm at a wavelength of 1.55 µm and an outer size (long L×wide W×high H) of 110 mm or less×110 mm or less×18 mm or less is obtained when an optical fiber comprising the structure mentioned above (optical fiber according to the present invention) is employed, whereas a dispersion compensator having an accumulated chromatic dispersion of −640 to 0 ps/nm at a wavelength of 1.55 µm and an outer size (long L×wide W×high H) of 110 mm or less×110 mm or less×18 mm or less is obtained when the above-mentioned optical fiber having a coating layer with an outer diameter of 145 µm or less is employed. Employing an optical fiber having the above-mentioned structure (optical fiber according to the present invention) makes it possible to yield a dispersion compensator having an accumulated chromatic dispersion of −270 to 0 ps/nm at a wavelength of 1.55 µm and an outer size (long L×wide W×high H) of 110 mm or less×110 mm or less×14 mm or less, whereas employing a dispersion-compensating optical fiber having a coating layer with an outer diameter of 145 µm or less can yield a dispersion compensator having an accumulated chromatic dispersion of −440 to 0 ps/nm at a wavelength of 1.55 µm and an outer size (long L×wide W×high H) of 110 mm or less×110 mm or less×14 mm or less, thus enabling a further compactness. The housing of the dispersion compensator may have a thin sheet-like form with a height of about 5 mm.

BRIEF DESCRIPTION OF THE DRAWINGS

FIG. 7 is a table for explaining optical fibers of types No. 1 to No. 3 prepared as examples of a dispersion-compensating optical fiber employable in the dispersion compensator according to the present invention;

FIG. 10 is a table for explaining characteristics, outer sizes, and the like of Samples 1 to 17 prepared as examples of the dispersion compensator according to the present invention;

FIG. 14 is a table for explaining structures and characteristics of optical fibers of types No. 4 to No. 10 prepared as examples of a dispersion-compensating optical fiber (dispersion-compensating optical fiber according to the present invention) employable in the dispersion compensator according to the present invention;

DETAILED DESCRIPTION OF THE PREFERRED EMBODIMENTS

In the following, embodiments of the dispersion compensator, optical transmission system, and optical fiber will be explained in detail with reference to FIGS. 1 to 7, 8A to 9B, 10, 11A to 12B, and 13 to 21. In the explanation of the drawings, constituents identical to each other or those having functions identical to each other will be referred to with numerals identical to each other without repeating their overlapping descriptions.

Figure 1:
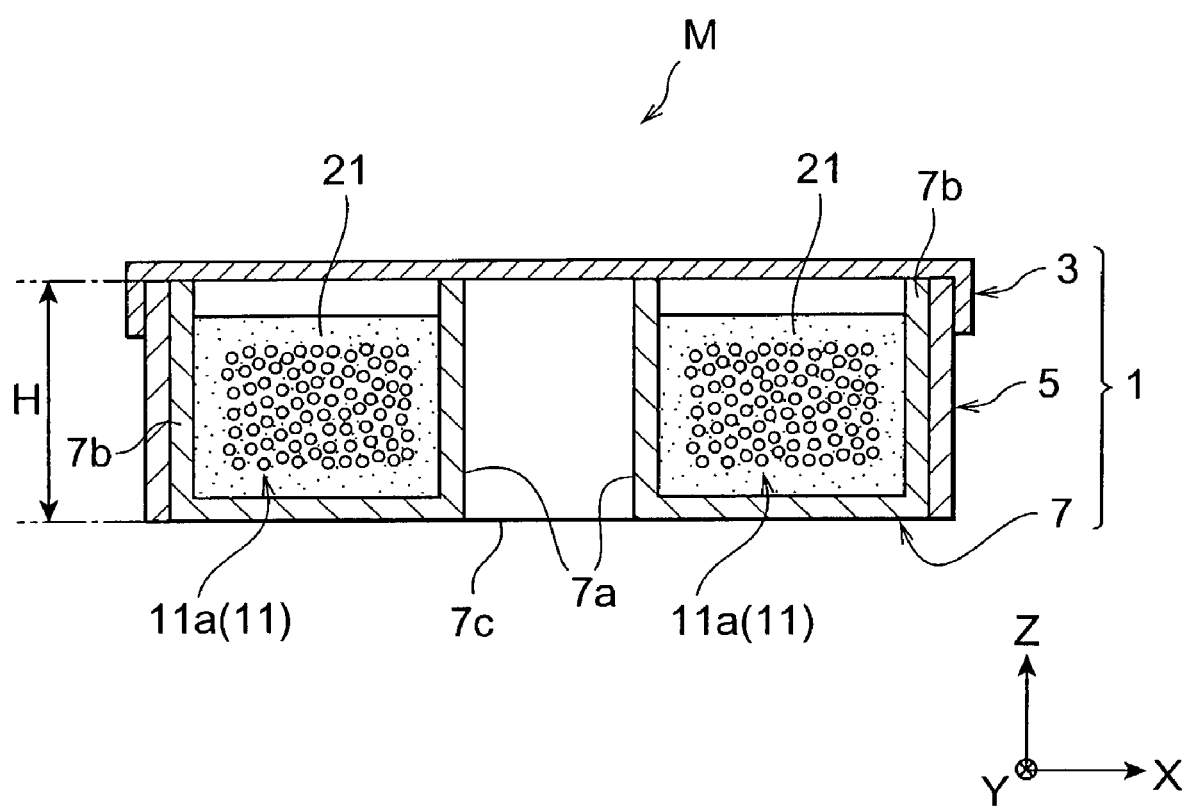
FIG. 1 is a sectional view showing the configuration of a first embodiment of the dispersion compensator according to the present invention.
Figure 2:
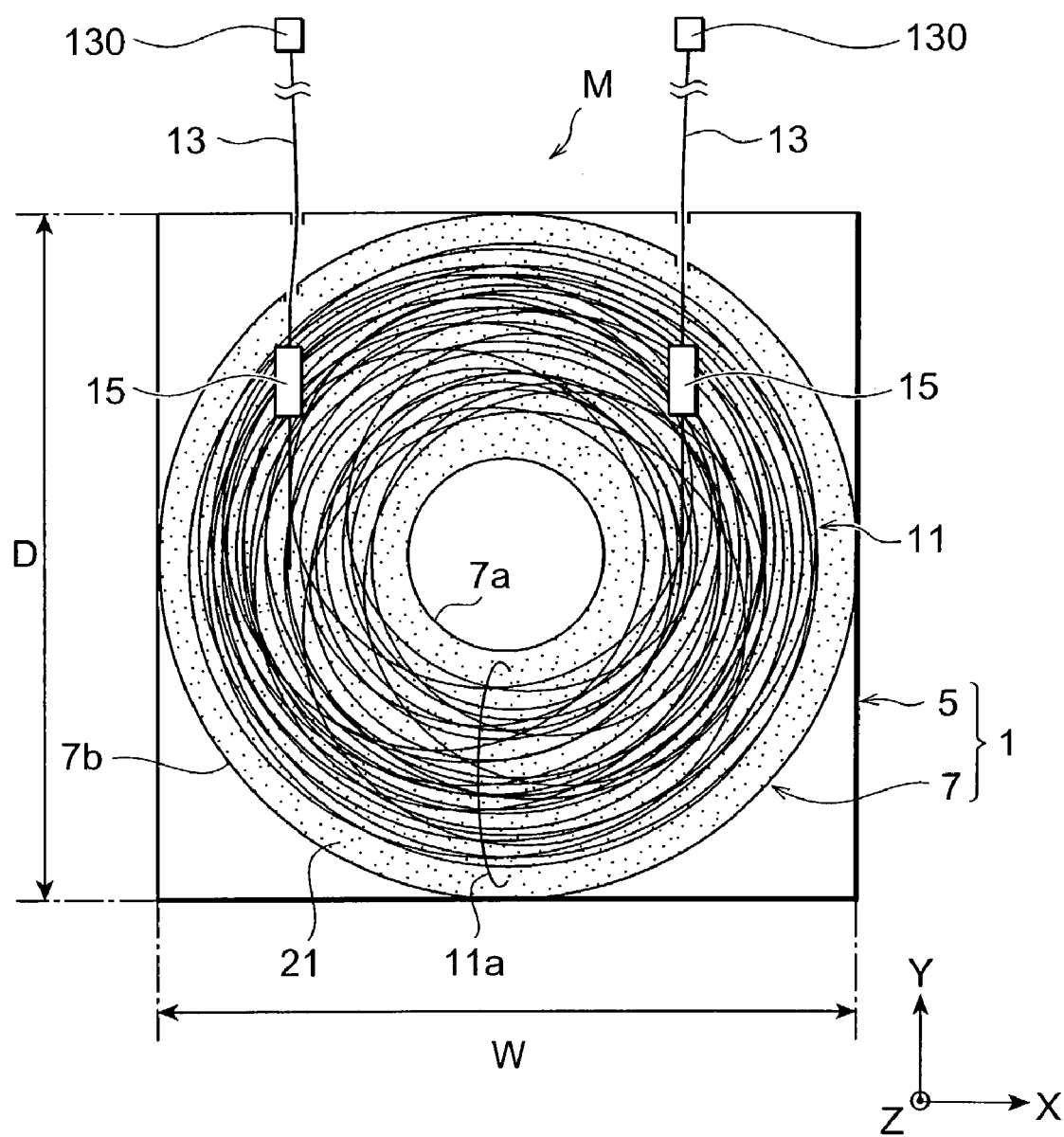
FIG. 2 is a plan view showing the configuration of the first embodiment of the dispersion compensator according to the present invention (in a state having its lid removed)

First, FIG. 1 is a sectional view showing the configuration of a first embodiment of the dispersion compensator according to the present invention, whereas FIG. 2 is a plan view thereof (in a state having removed its lid).

The dispersion compensator M according to the first embodiment comprises a housing 1 and an optical fiber coil 11 accommodated in the housing 1. The housing 1 includes a lid 3 for tightly closing the housing 1, a square outer container 5, and a doughnut-shaped inner container 7. The inner container 7 has an inner wall part 7a, an outer wall part 7b, and a bottom part 7c. Each of the inner wall part 7a and the outer wall part 7b has a circular form.

The optical fiber coil 11 has a coiled part 11a constituted by a dispersion-compensating optical fiber (DCF) wound like a coil while being in a bundle state with its winding distortion substantially eliminated. Both ends of the dispersion-compensating optical fiber constituting the optical fiber coil 11 are connected to respective ends of pigtail fibers 13 by fusion-spliced parts 15. Each pigtail fiber 13 is drawn out of the inner container 7 by way of a cutout formed at the outer wall part 7b. Further, the pigtail fiber 13 is drawn out of the housing 1 by way of a cutout formed in the outer container 5, whereas the other end is connected to an optical connector 130. Preferably, the cutout formed at the outer wall part 7b is set to such a size that a resin 21 does not flow out of the inner container 7.

Here, the state in which the winding distortion is substantially eliminated indicates a state where the increase in loss caused by the winding distortion is substantially released in the wavelength band in use, and specifically refers to a state where the increase in transmission loss caused by the winding in the wavelength band of 1.62 μm is lowered by at least 0.1 dB/km. This dispersion-compensating optical fiber is wound about a bobbin acting as a center drum and then is removed therefrom, so as to be formed like a coil (optical fiber coil 11). This is because of the fact that the increase in transmission loss of the dispersion-compensating optical fiber in a state removed from the bobbin and raveled out is substantially eliminated as disclosed in Japanese Patent Application Laid-Open No. HEI 10-123342, and the transmission loss caused by the winding distortion is eliminated when the latter disappears.

The inner container 7 of the housing 1 is filled with the resin 21 such that the coiled part 11a of the optical fiber coil 11 is surrounded therewith, whereby the coiled part 11a of the optical fiber coil 11 is held by the resin 21. Preferably, the resin 21 also enters interstices in a bundle of the dispersion-compensating optical fiber constituting the coiled part 11a of the optical fiber coil 11.

Usable as the resin 21 are silicone resins having a thermosetting, moisture-curing, or UV-curing property or the like which cure upon a chemical reaction, highly viscous jelly-like admixtures in which rubbers such as butadiene and silicone are swelled with solvents such as silicone and naphthene optionally doped with other resins and the like when necessary, and the like.

Preferably, the optical fiber coil 11 is secured within the cured resin 21 at a position not in contact with the side wall parts 7a, 7b of the inner container 7. When the optical fiber coil 11 is thus secured within the cured resin 21 while in a state not in contact with the side wall parts 7a, 7b of the inner container 7, the dispersion-compensating optical fiber constituting the optical fiber coil 11 and the side wall parts 7a, 7b can reliably be restrained from coming into contact with each other.

Preferably, the cured resin 21 is a material whose ¼ consistency (using a ¼ cone) falls within the range of 5 to 200 in the whole measurement temperature range of −20° C. to 70° C. When the resin 21 is caused to have the physical property mentioned above, it can further prevent external forces from being applied to the optical fiber. If the ¼ consistency of the resin 21 is less than 5 in this case, the loss on the longer wavelength side of the optical fiber (optical fiber coil 11) becomes so large that it is unsuitable for practical use. When the ¼ consistency exceeds 200, by contrast, the optical fiber coil 11 cannot be held by the resin 21, so that the coiled state may collapse while in use, and so forth, whereby transmission characteristics may not be kept constant. In the specification, "¼ consistency" is defined by JISK 2220-1993. Also, "¼ cone" is defined by JIS K 2220-1993.

Figure 3:
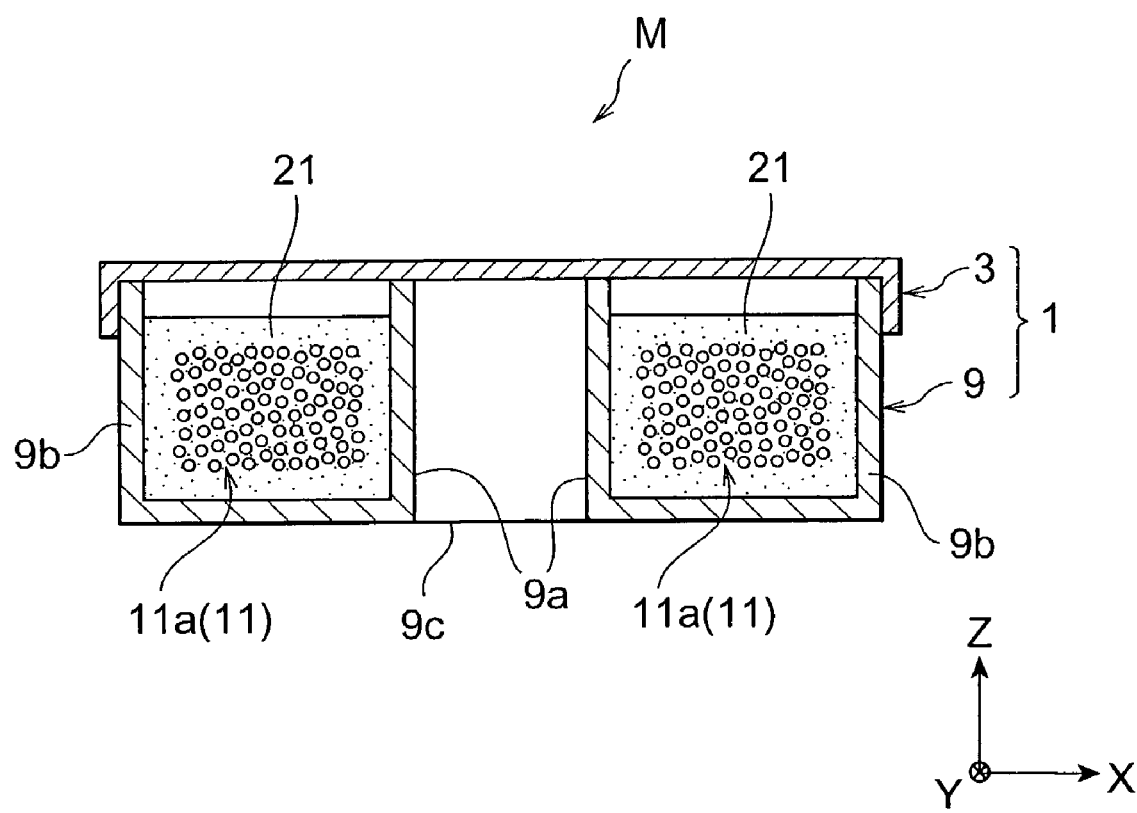
FIG. 3 is a sectional view showing the configuration of a second embodiment of the dispersion compensator according to the present invention.
Figure 4:
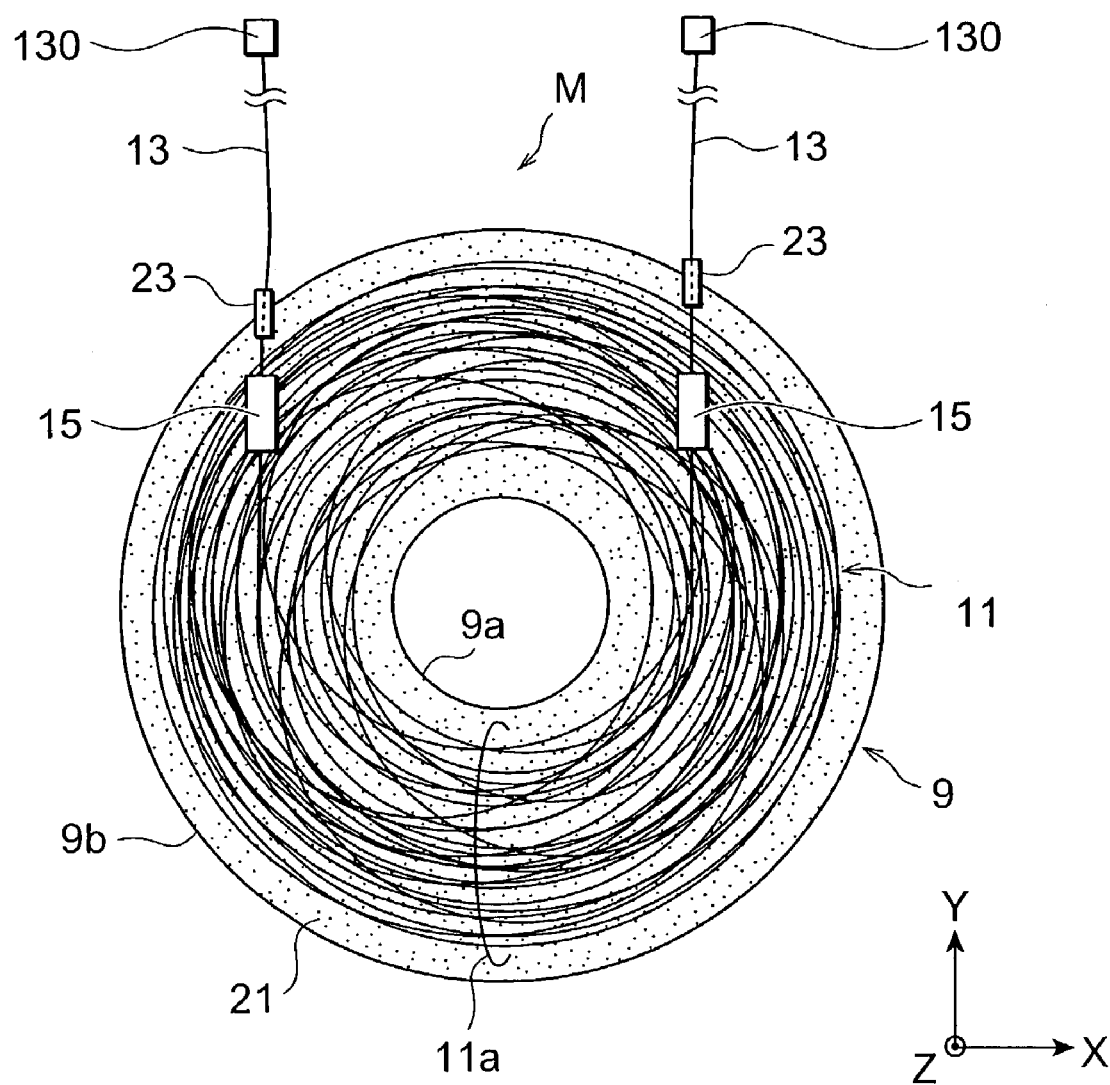
FIG. 4 is a plan view showing the configuration of the second embodiment of the dispersion compensator according to the present invention (in a state having its lid removed)

The form of the housing 1 is not restricted to that mentioned above. For example, as shown in FIGS. 3 and 4, a doughnut-shaped container may also be employed as the housing 1 (second embodiment). In this case, the housing 1 has a container 9, which includes an inner wall part 9a, an outer wall part 9b, and a bottom part 9c, whereas each of the inner wall part 9a and outer wall part 9b exhibits a circular form. Each pigtail fiber 13 is inserted into a rubber tube 23 secured to a cutout formed in the outer wall part 9b, so as to be drawn out of the housing 1. The rubber tube 23 functions to prevent the resin 21 from leaking out of the container 9. Here, FIG. 3 is a sectional view showing the configuration of the second embodiment of the dispersion compensator according to the present invention, whereas FIG. 4 is its plan view (in a state having its lid removed).

Figure 5:
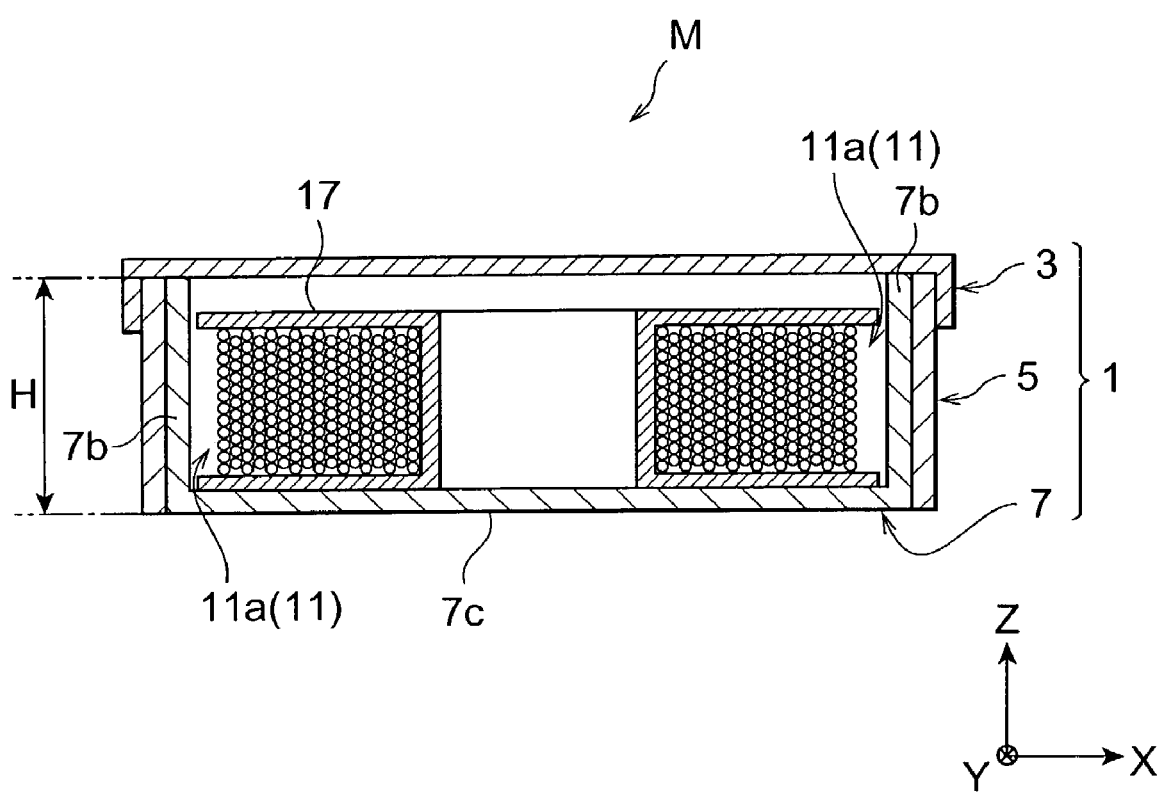
FIG. 5 is a sectional view showing the configuration of a third embodiment of the dispersion compensator according to the present invention.
Figure 6:
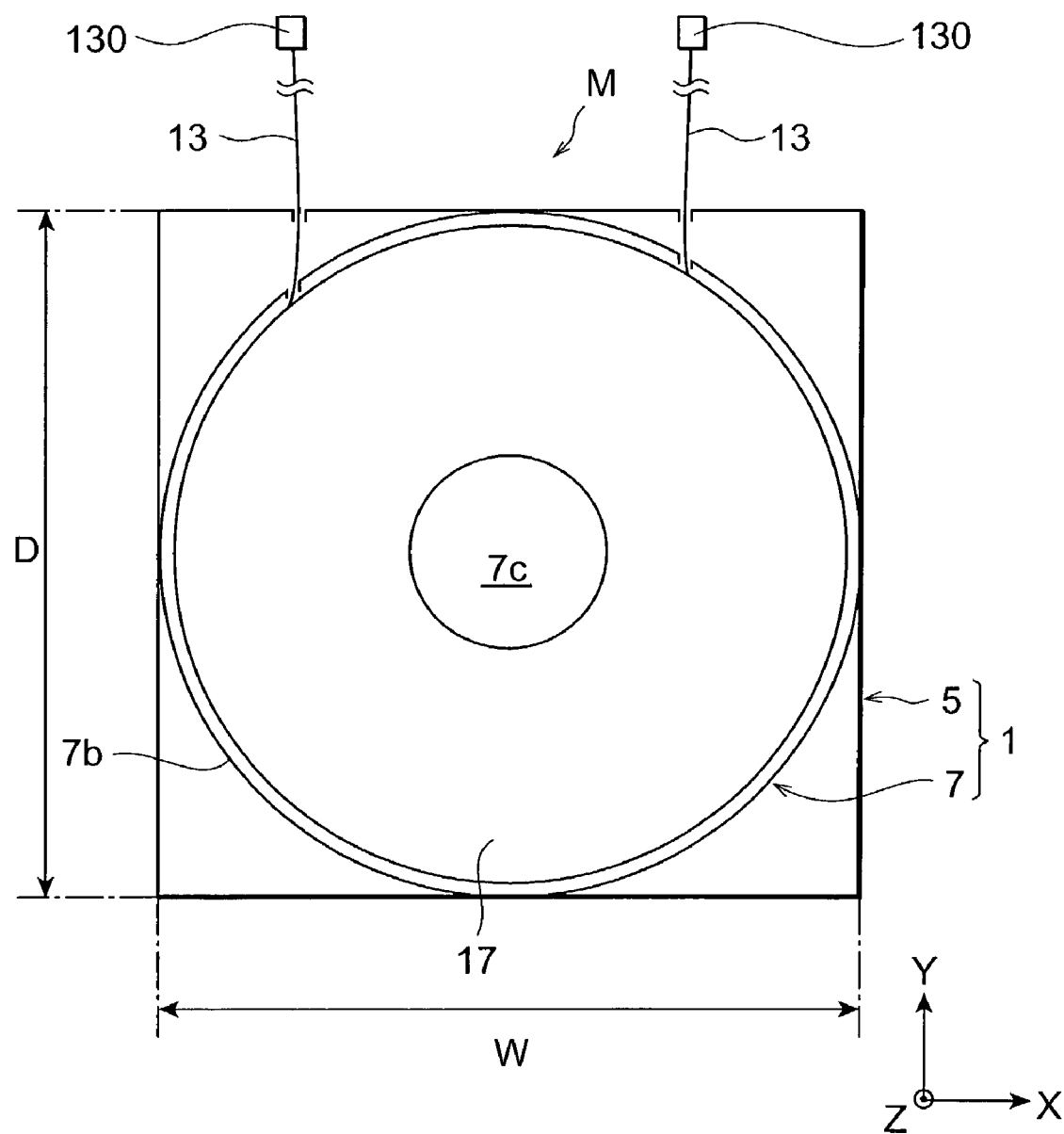
FIG. 6 is a plan view showing the configuration of the third embodiment of the dispersion compensator according to the present invention (in a state having its lid removed)

Further, it is not always necessary for the optical fiber coil 11 to be removed from the bobbin, whereas the dispersion-compensating optical fiber may be accommodated in the housing 1 while in a state wound about the bobbin 17 as shown in FIGS. 5 and 6 (third embodiment). In this case, the housing 1 may have either a square or circular form. Also, a part of the bobbin 17 may be configured so as to become the housing 1.

Not only the above-mentioned resin 21, but also elastically deformable cushioning materials such as sponge may be used as means for keeping the form of optical fiber coil 11.

Dispersion-compensating optical fibers employable in the dispersion compensator according to the present invention will now be explained. Here, three types of dispersion-compensating optical fibers No. 1 to 3 are used as shown in FIG. 7.

Figure 8A:
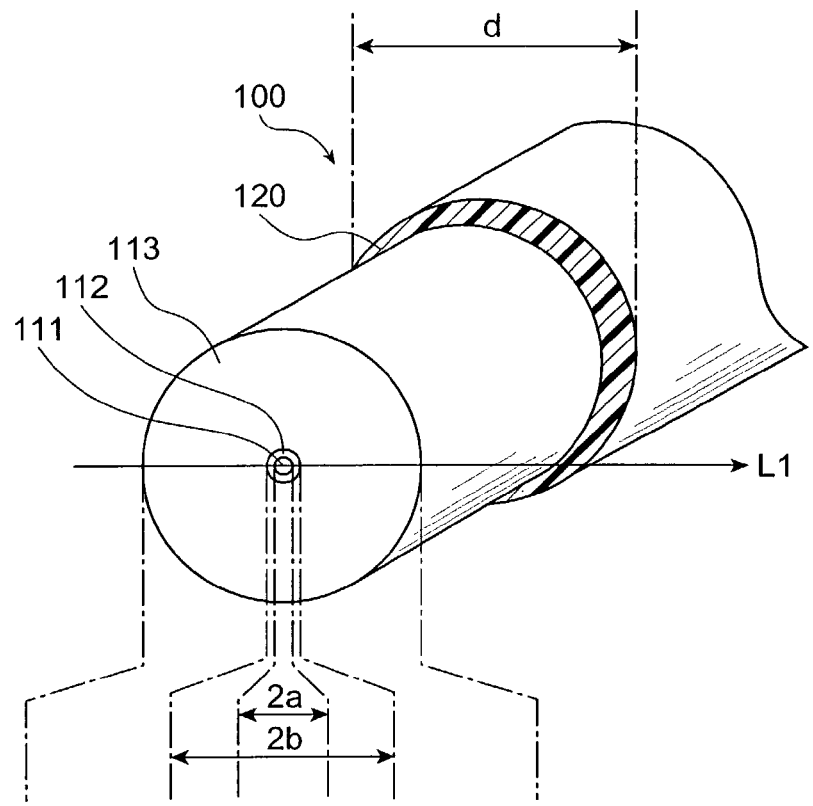
FIGS. 8A and 8B are a sectional view showing the structure of a dispersion-compensating optical fiber belonging to type No. 1 and a refractive index profile thereof, respectively.
Figure 8B:
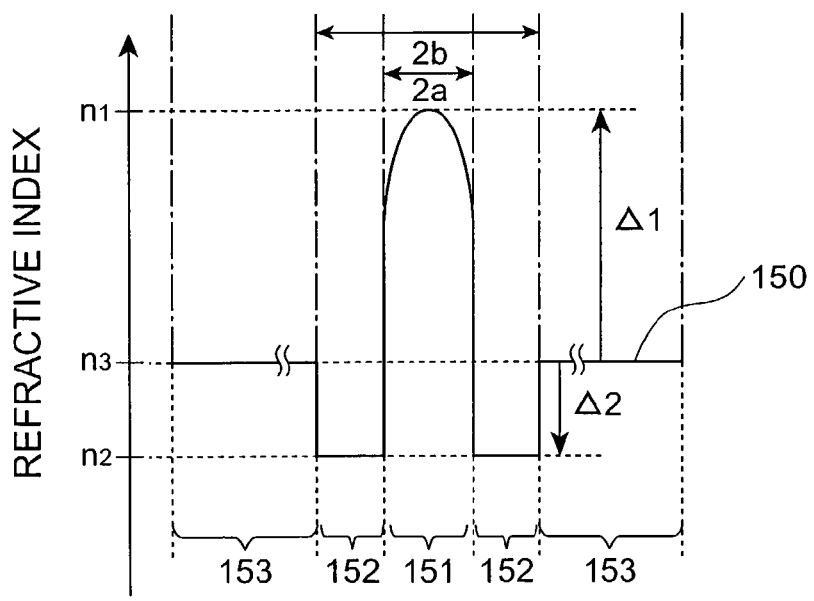
Figure 9A:
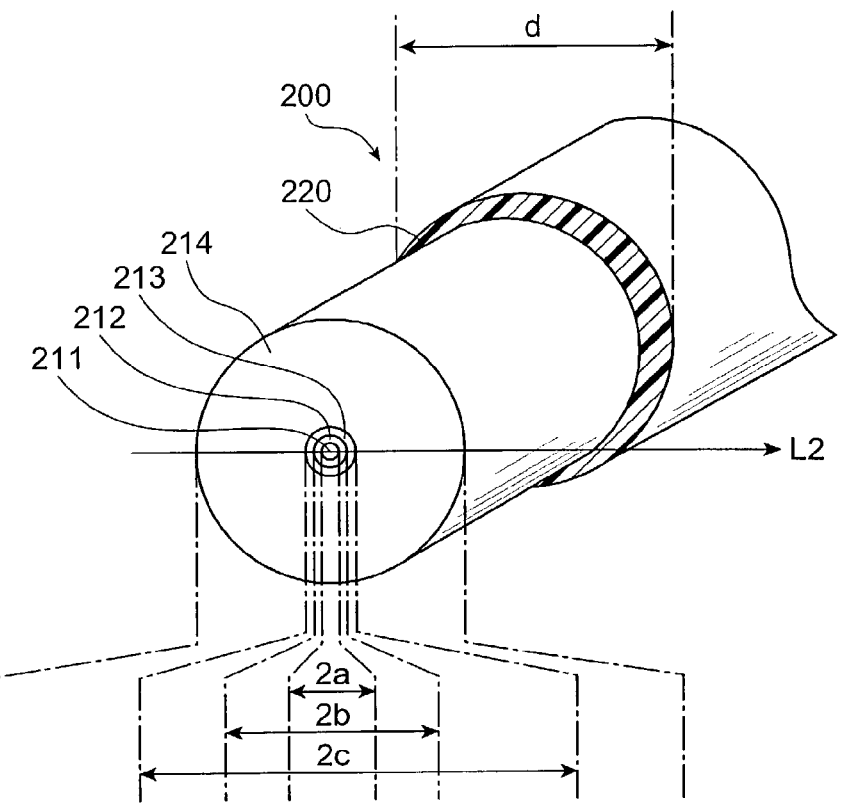
FIGS. 9A and 9B are a sectional view showing the structure of a dispersion-compensating optical fiber belonging to type No. 2 or 3 and a refractive index profile thereof, respectively.
Figure 9B:
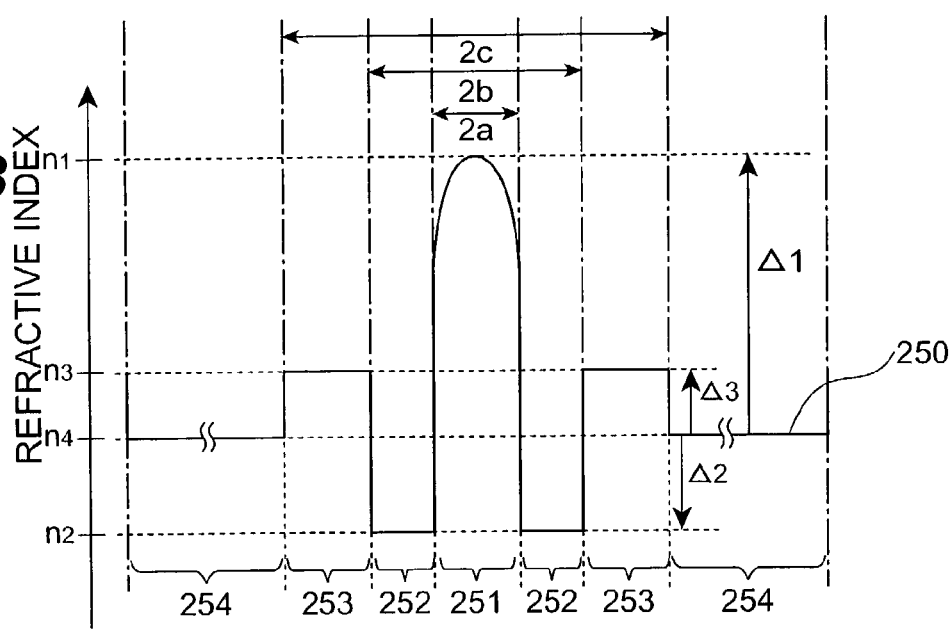

Type No. 1 is represented by an optical fiber 100 having a refractive index profile of double cladding structure as shown in FIGS. 8A and 8B, whereas types No. 2 and No. 3 are represented by an optical fiber 200 having a refractive index profile of triple cladding structure (triple cladding type refractive index profile) shown in FIGS. 9A and 9B.

FIG. 8A is a view showing a cross-sectional structure of the optical fiber 100 of type No. 1, whereas FIG. 8B is its refractive index profile. In particular, FIG. 8A shows a cross section of the optical fiber 100 orthogonal to its optical axis, whereas FIG. 8B is a refractive index profile 150 showing the refractive index of individual glass regions along a line L1 in FIG. 8A. The optical fiber 100 comprises a center core part 111 extending along the optical axis and having an outer diameter 2a; a first cladding part 112 surrounding the center core part 111 and having an outer diameter 2b; a second cladding part 113 surrounding the first cladding part 112; and a coating layer 120 surrounding the second cladding part 113 and having an outer diameter 2d.

The center core part 111 to the second cladding part 113 are mainly composed of silica glass ($SiO_2$), whereas at least the center core part 111 and first cladding part 112 are doped with impurities for refractive index adjustment. The refractive index profile 150 is obtained, for example, when the center core part 111 is constituted by silica glass doped with $GeO_2$, the first cladding part 112 is constituted by silica glass doped with F, and the second cladding part 113 is constituted by pure silica. The maximum refractive index n1 of the center core part 111 is set higher than the refractive index n3 of the second cladding part 113, whereas the refractive index n2 of the first cladding part 112 is set lower than the refractive index n3 of the second cladding part 113. Here, the area corresponding to the center core part 111 in the refractive index profile 150 is substantially shaped like a dome, so that the refractive index decreases from the optical axis center toward the periphery.

The refractive index profile 150 shown in FIG. 8B illustrates the refractive index of individual parts along the line L1 in FIG. 8A, such that areas 151, 152, and 153 indicate refractive indices on the line L1 of the center core part 111, first cladding part 112, and second cladding part 113, respectively. The relative refractive index difference Δ1 of the center core part 111 (having the refractive index n1) with reference to the second cladding part 113 (having the refractive index n3) is given by (n1−n3)/n3, whereas the relative refractive index difference Δ2 of the first cladding part 112 (having the refractive index n2) with reference to the second cladding part 113 (having the refractive index n3) is given by (n2−n3)/n3.

FIG. 9A is a view showing a cross-sectional structure of the optical fiber 200 of type No. 2 or No. 3, whereas FIG. 9B is its refractive index profile. In particular, FIG. 9A shows a cross section of the optical fiber 200 orthogonal to its optical axis, whereas FIG. 9B is a refractive index profile 250 showing the refractive index of individual glass regions along a line L2 in FIG. 9A. The optical fiber 200 comprises a center core part 211 extending along the optical axis and having an outer diameter 2a; a first cladding part 212 surrounding the center core part 211 and having an outer diameter 2b; a second cladding part 213 surrounding the first cladding part 212 and having an outer diameter 2c; a third cladding part 214 surrounding the second cladding part 213; and a coating layer 220 surrounding the third cladding part 214 and having an outer diameter 2d.

The center core part 211 to the third cladding part 214 are mainly composed of silica glass ($SiO_2$), whereas at least the center core part 211, first cladding part 212, and second cladding part 213 are doped with impurities for refractive index adjustment. The refractive index profile 250 is obtained, for example, when the center core part 211 is constituted by silica glass doped with $GeO_2$, the first cladding part 212 is constituted by silica glass doped with F, the second cladding part 213 is constituted by silica glass doped with $GeO_2$, and the third cladding part 214 is constituted by pure silica. The maximum refractive index n1 of the center core part 211 is set higher than the refractive index n4 of the third cladding part 214, whereas the refractive index n2 of the first cladding part 212 is set lower than the refractive index n4 of the third cladding part 214. The refractive index n3 of the second cladding part 213 is set lower than the refractive index n1 of the center core part 211 but higher than the refractive index n4 of the third cladding part 214. Here, the area corresponding to the center core part 211 in the refractive index profile 250 is substantially shaped like a dome, so that the refractive index decreases from the optical axis center toward the periphery.

The refractive index profile 250 shown in FIG. 9B illustrates the refractive index of individual parts along the line L2 in FIG. 9A, such that areas 251, 252, 253, and 254 indicate refractive indices on the line L2 of the center core part 211, first cladding part 212, second cladding part 213, and third cladding part 214, respectively. The relative refractive index difference $\Delta 1$ of the center core part 211 (having the refractive index n1) with reference to the third cladding part 214 (having the refractive index n4) is given by (n1−n4)/n4, the relative refractive index difference $\Delta 2$ of the first cladding part 212 (having the refractive index n2) with reference to the third cladding part 213 (having the refractive index n4) is given by (n2−n4)/n4, and the relative refractive index difference $\Delta 3$ of the second cladding part 213 (having the refractive index n3) with reference to the third cladding part 214 (having the refractive index n4) is given by (n3−n4)/n4.

The optical fiber of type No. 1 is a dispersion-compensating optical fiber having a double cladding structure shown in FIGS. 8A and 8B, in which the outer diameter 2a of the center core part 111 is 2.5 μm, whereas the outer diameter 2b of the first cladding part 112 is 6.2 μm. With reference to the refractive index n3 of the second cladding part 113, the relative refractive index difference $\Delta 1$ of the center core part 111 is 3.0%, and the relative refractive index difference $\Delta 2$ of the first cladding part 112 is −0.35%.

The dispersion-compensating optical fiber of type No. 1 has, as characteristics at a wavelength of 1.55 μm, a chromatic dispersion of −147 ps/nm/km, a dispersion slope of −0.120 ps/nm$^2$/km, a mode field diameter (MFD) of 4.3 μm, a bending loss of 8.69 dB/km in a state bent at a diameter of 40 mm, and a bending loss of 0.02 dB/km in a state bent at a diameter of 60 mm. In this type, the effective cutoff wavelength (cutoff wavelength in the $LP_{11}$ mode in a state where the optical fiber having a length of 2 m is loosely wound by one turn at a radius of 140 mm) is 0.71 μm.

The optical fiber of type No. 2 is a dispersion-compensating optical fiber having a triple cladding structure shown in FIGS. 9A and 9B, in which the outer diameter 2a of the center core part 211 is 3.4 μm, the outer diameter 2b of the first cladding part 212 is 7.4 μm, and the outer diameter 2c of the second cladding part 213 is 15.4 μm. With reference to the refractive index n4 of the third cladding part 214, the relative refractive index difference $\Delta 1$ of the center core part 211 is 2.4%, the relative refractive index difference $\Delta 2$ of the first cladding part 212 is −0.72%, and the relative refractive index difference $\Delta 3$ of the second cladding part 213 is 0.30%.

The dispersion-compensating optical fiber of type No. 2 has, as characteristics at a wavelength of 1.55 μm, a chromatic dispersion of −242 ps/nm/km, a dispersion slope of −0.655 ps/nm$^2$/km, a mode field diameter (MFD) of 4.5 μm, a bending loss of 0.06 dB/km in a state bent at a diameter of 40 mm, and a bending loss of less than 0.001 dB/km in a state bent at a diameter of 60 mm. In this type, the effective cutoff wavelength is 1.65 μm.

The optical fiber of type No. 3 is also a dispersion-compensating optical fiber having a triple cladding structure shown in FIGS. 9A and 9B, in which the outer diameter 2a of the center core part 211 is 2.8 μm, the outer diameter 2b of the first cladding part 212 is 7.0 μm, and the outer diameter 2c of the second cladding part 213 is 14.0 μm. With reference to the refractive index n4 of the third cladding part 214, the relative refractive index difference $\Delta 1$ of the center core part 211 is 3.0%, the relative refractive index difference $\Delta 2$ of the first cladding part 212 is −0.72%, and the relative refractive index difference $\Delta 3$ of the second cladding part 213 is 0.30%.

The dispersion-compensating optical fiber of type No. 3 has, as characteristics at a wavelength of 1.55 μm, a chromatic dispersion of −320 ps/nm/km, a dispersion slope of −0.595 ps/nm$^2$/km, a mode field diameter (MFD) of 4.2 μm, a bending loss of 0.44 dB/km in a state bent at a diameter of 40 mm, and a bending loss of less than 0.001 dB/km in a state bent at a diameter of 60 mm. In this type, the effective cutoff wavelength is 1.47 μm.

A plurality of samples of dispersion compensator M employing any of the dispersion-compensating optical fibers of above-mentioned types No. 1 to No. 3 are prepared, whose characteristics, outer sizes, and the like will now be explained. FIG. 10 is a table for explaining characteristics, outer sizes, and the like of Samples 1 to 17 prepared as examples of the dispersion compensator according to the present invention.

Sample 1

The dispersion compensator M of Sample 1 employs a dispersion-compensating optical fiber of type No. 1 having a length of 2.05 km. The optical fiber coil 11 of type No. 1 is wound about a bobbin and then is removed therefrom, so as to be accommodated in the housing 1. The optical fiber coil 11 is molded with the resin 21. In the dispersion-compensating optical fiber of type No. 1, the second cladding part 113 has an outer diameter (glass diameter) of 80 μm, whereas the outer diameter (coat diameter) including the coating layer 120 is 120 μm. The resin 21 is a silicone gel, which is cured by heating for 2 hours at 70° C., so as to hold the optical fiber coil 11.

The outer diameter of the barrel of the bobbin (the bobbin diameter, corresponding to the winding inner diameter of the coiled dispersion-compensating optical fiber) for winding the dispersion-compensating optical fiber is 58 mm, the outermost diameter (coil outer diameter) of the optical fiber coil 11 in the state wound with type No. 1 is 82 mm, and the coil width of the optical fiber coil 11 in the state wound about the bobbin is 12 mm. The housing 1 prepared has an outer size of 102 mm (long L)×102 mm (wide W)×17 mm (high H), whereas its volume is 177 cm$^3$. The dispersion compensator M has a total dispersion value (corresponding to accumulated chromatic dispersion) of −300 ps/nm, a total dispersion slope of −0.25 ps/nm$^2$, and an insertion loss of 3.5 dB.

Sample 2

The dispersion compensator M of Sample 2 employs a dispersion-compensating optical fiber of type No. 1 having a length of 4.09 km. As in the above-mentioned Sample 1, the optical fiber coil 11 is accommodated in the housing 1, and the resin 21 is cured, whereby the optical fiber coil 11 is held. In sample 2, the dispersion-compensating optical fiber has a glass diameter of 80 μm and a coat diameter of 120 μm. It has a bobbin diameter of 58 mm, a coil outer diameter of 101 mm, and a coil width of 12 mm. The housing 1 prepared has an outer size of 121 mm (long L)×121 mm (wide W)×17 mm (high H), whereas its volume is 249 cm³. The dispersion compensator M has an accumulated chromatic dispersion of −600 ps/nm, a total dispersion slope of −0.49 ps/nm², and an insertion loss of 5.2 dB.

Sample 3

The dispersion compensator M of Sample 3 employs a dispersion-compensating optical fiber of type No. 1 having a length of 2.05 km. As in Sample 1, the optical fiber coil 11 is accommodated in the housing 1, and the resin 21 is cured, whereby the optical fiber coil 11 is held. In Sample 3, the dispersion-compensating optical fiber has a glass diameter of 90 μm and a coat diameter of 145 μm. It has a bobbin diameter of 58 mm, a coil outer diameter of 91 mm, and a coil width of 12 mm. The housing 1 prepared has an outer size of 111 mm (long L)×111 mm (wide W)×17 mm (high H), whereas its volume is 209 cm³. The dispersion compensator M has an accumulated chromatic dispersion of −300 ps/nm, a total dispersion slope of −0.25 ps/nm², and an insertion loss of 3.5 dB.

Sample 4

The dispersion compensator M of Sample 4 employs a dispersion-compensating optical fiber of type No. 1 having a length of 4.09 km. As in Sample 1, the optical fiber coil 11 is accommodated in the housing 1, and the resin 21 is cured, whereby the optical fiber coil 11 is held. In Sample 4, the dispersion-compensating optical fiber has a glass diameter of 90 μm and a coat diameter of 145 μm. It has a bobbin diameter of 58 mm, a coil outer diameter of 115 mm, and a coil width of 12 mm. The housing 1 prepared has an outer size of 135 mm (long L)×135 mm (wide W)×17 mm (high H), whereas its volume is 310 cm³. The dispersion compensator M has an accumulated chromatic dispersion of −600 ps/nm, a total dispersion slope of −0.49 ps/nm², and an insertion loss of 5.2 dB.

Sample 5

The dispersion compensator M of Sample 5 employs a dispersion-compensating optical fiber of type No. 2 having a length of 0.33 km. As in Sample 1, the optical fiber coil 11 is accommodated in the housing 1, and the resin 21 is cured, whereby the optical fiber coil 11 is held. In Sample 5, the third cladding part 214 in the dispersion-compensating optical fiber of type No. 2 has an outer diameter (glass diameter) of 125 μm and a coat diameter of 185 μm. It has a bobbin diameter of 40 mm, a coil outer diameter of 54 mm, and a coil width of 12 mm. The housing 1 prepared has an outer size of 74 mm (long L)×74 mm (wide W)×17 mm (high H), whereas its volume is 93 cm³. The dispersion compensator M has an accumulated chromatic dispersion of −80 ps/nm, a total dispersion slope of −0.22 ps/nm², and an insertion loss of 2.2 dB.

Sample 6

The dispersion compensator M of Sample 6 employs a dispersion-compensating optical fiber of type No. 2 having a length of 0.74 km. As in Sample 1, the optical fiber coil 11 is accommodated in the housing 1, and the resin 21 is cured, whereby the optical fiber coil 11 is held. In Sample 6, the dispersion-compensating optical fiber has a glass diameter of 125 μm and a coat diameter of 185 μm. It has a bobbin diameter of 40 mm, a coil outer diameter of 68 mm, and a coil width of 12 mm. The housing 1 prepared has an outer size of 88 mm (long L)×88 mm (wide W)×17 mm (high H),whereas its volume is 132 cm³. The dispersion compensator M has an accumulated chromatic dispersion of −180 ps/nm, a total dispersion slope of −0.49 ps/nm², and an insertion loss of 2.5 dB.

Sample 7

The dispersion compensator M of Sample 7 employs a dispersion-compensating optical fiber of type No. 2 having a length of 1.24 km. As in Sample 1, the optical fiber coil 11 is accommodated in the housing 1, and the resin 21 is cured, whereby the optical fiber coil 11 is held. In Sample 7, the dispersion-compensating optical fiber has a glass diameter of 125 μm and a coat diameter of 185 μm. It has a bobbin diameter of 40 mm, a coil outer diameter of 81 mm, and a coil width of 12 mm. The housing 1 prepared has an outer size of 101 mm (long L)×101 mm (wide W)×17 mm (high H), whereas its volume is 173 cm³. The dispersion compensator M has an accumulated chromatic dispersion of −300 ps/nm, a total dispersion slope of −0.81 ps/nm², and an insertion loss of 2.9 dB.

Sample 8

The dispersion compensator M of Sample 8 employs a dispersion-compensating optical fiber of type No. 2 having a length of 2.48 km. As in Sample 1, the optical fiber coil 11 is accommodated in the housing 1, and the resin 21 is cured, whereby the optical fiber coil 11 is held. In Sample 8, the dispersion-compensating optical fiber has a glass diameter of 125 μm and a coat diameter of 185 μm. It has a bobbin diameter of 50 mm, a coil outer diameter of 111 mm, and a coil width of 12 mm. The housing 1 prepared has an outer size of 131 mm (long L)×131 mm (wide W)×17 mm (high H), whereas its volume is 292 cm³. The dispersion compensator M has an accumulated chromatic dispersion of −600 ps/nm, a total dispersion slope of −1.63 ps/nm², and an insertion loss of 3.9 dB.

Sample 9

The dispersion compensator M of Sample 9 employs a dispersion-compensating optical fiber of type No. 2 having a length of 4.97 km. As in Sample 1, the optical fiber coil 11 is accommodated in the housing 1, and the resin 21 is cured, whereby the optical fiber coil 11 is held. In Sample 9, the dispersion-compensating optical fiber has a glass diameter of 125 μm and a coat diameter of 185 μm. It has a bobbin diameter of 50 mm, a coil outer diameter of 150 mm, and a coil width of 12 mm. The housing 1 prepared has an outer size of 170 mm (long L)×170 mm (wide W)×17 mm (high H), whereas its volume is 491 cm³. The dispersion compensator M has an accumulated chromatic dispersion of −1200 ps/nm, a total dispersion slope of −3.25 ps/nm², and an insertion loss of 5.9 dB.

Sample 10

The dispersion compensator M of Sample 10 employs a dispersion-compensating optical fiber of type No. 3 having a length of 0.25 km. As in Sample 1, the optical fiber coil 11 is accommodated in the housing 1, and the resin 21 is cured, whereby the optical fiber coil 11 is held. In Sample 10, the dispersion-compensating optical fiber has a glass diameter of 125 μm and a coat diameter of 185 μm. It has a bobbin diameter of 40 mm, a coil outer diameter of 51 mm, and a coil width of 12 mm. The housing 1 prepared has an outer size of 71 mm (long L)×71 mm (wide W)×17 mm (high H), whereas its volume is 86 cm³. The dispersion compensator M has an accumulated chromatic dispersion of −80 ps/nm, a total dispersion slope of −0.15 ps/nm², and an insertion loss of 2.1 dB.

Sample 11

The dispersion compensator M of Sample 11 employs a dispersion-compensating optical fiber of type No. 3 having a length of 0.56 km. As in Sample 1, the optical fiber coil 11 is accommodated in the housing 1, and the resin 21 is cured, whereby the optical fiber coil 11 is held. In Sample 11, the dispersion-compensating optical fiber has a glass diameter of 125 μm and a coat diameter of 185 μm. It has a bobbin diameter of 40 mm, a coil outer diameter of 62 mm, and a coil width of 12 mm. The housing 1 prepared has an outer size of 82 mm (long L)×82 mm (wide W)×17 mm (high H), whereas its volume is 114 cm$^3$. The dispersion compensator M has an accumulated chromatic dispersion of −180 ps/nm, a total dispersion slope of −0.34 ps/nm$^2$, and an insertion loss of 2.4 dB.

Sample 12

The dispersion compensator M of Sample 12 employs a dispersion-compensating optical fiber of type No. 3 having a length of 0.94 km. As in Sample 1, the optical fiber coil 11 is accommodated in the housing 1, and the resin 21 is cured, whereby the optical fiber coil 11 is held. In Sample 12, the dispersion-compensating optical fiber has a glass diameter of 125 μm and a coat diameter of 185 μm. It has a bobbin diameter of 40 mm, a coil outer diameter of 73 mm, and a coil width of 12 mm. The housing 1 prepared has an outer size of 93 mm (long L)×93 mm (wide W)×17 mm (high H), whereas its volume is 147 cm$^3$. The dispersion compensator M has an accumulated chromatic dispersion of −300 ps/nm, a total dispersion slope of −0.56 ps/nm$^2$, and an insertion loss of 2.7 dB.

Sample 13

The dispersion compensator M of Sample 13 employs a dispersion-compensating optical fiber of type No. 3 having a length of 1.88 km. As in Sample 1, the optical fiber coil 11 is accommodated in the housing 1, and the resin 21 is cured, whereby the optical fiber coil 11 is held. In Sample 13, the dispersion-compensating optical fiber has a glass diameter of 125 μm and a coat diameter of 185 μm. It has a bobbin diameter of 50 mm, a coil outer diameter of 100 mm, and a coil width of 12 mm. The housing 1 prepared has an outer size of 120 mm (long L)×120 mm (wide W)×17 mm (high H), whereas its volume is 245 cm$^3$. The dispersion compensator M has an accumulated chromatic dispersion of −600 ps/nm, a total dispersion slope of −1.12 ps/nm$^2$, and an insertion loss of 3.4 dB.

Sample 14

The dispersion compensator M of Sample 14 employs a dispersion-compensating optical fiber of type No. 3 having a length of 3.76 km. As in Sample 1, the optical fiber coil 11 is accommodated in the housing 1, and the resin 21 is cured, whereby the optical fiber coil 11 is held. In Sample 14, the dispersion-compensating optical fiber has a glass diameter of 125 μm and a coat diameter of 185 μm. It has a bobbin diameter of 50 mm, a coil outer diameter of 132 mm, and a coil width of 12 mm. The housing 1 prepared has an outer size of 152 mm (long L)×152 mm (wide W)×17 mm (high H), whereas its volume is 393 cm$^3$. The dispersion compensator M has an accumulated chromatic dispersion of −1200 ps/nm, a total dispersion slope of −2.23 ps/nm$^2$, and an insertion loss of 4.9 dB.

Sample 15

The dispersion compensator M of Sample 15 employs a dispersion-compensating optical fiber of type No. 3 having a length of 3.76 km. As in Sample 1, the optical fiber coil 11 is accommodated in the housing 1, and the resin 21 is cured, whereby the optical fiber coil 11 is held. In Sample 15, the dispersion-compensating optical fiber has a glass diameter of 90 μm and a coat diameter of 145 μm. It has a bobbin diameter of 40 mm, a coil outer diameter of 104 mm, and a coil width of 12 mm. The housing 1 prepared has an outer size of 124 mm (long L)×124 mm (wide W)×17 mm (high H), whereas its volume is 261 cm$^3$. The dispersion compensator M has an accumulated chromatic dispersion of −1200 ps/nm, a total dispersion slope of −2.23 ps/nm$^2$, and an insertion loss of 4.9 dB.

Sample 16

The dispersion compensator M of Sample 16 employs a dispersion-compensating optical fiber of type No. 3 having a length of 3.76 km. As in Sample 1, the optical fiber coil 11 is accommodated in the housing 1, and the resin 21 is cured, whereby the optical fiber coil 11 is held. In Sample 16, the dispersion-compensating optical fiber has a glass diameter of 90 μm and a coat diameter of 145 μm. It has a bobbin diameter of 40 mm, a coil outer diameter of 153 mm, and a coil width of 5 mm. The housing 1 prepared has an outer size of 173 mm (long L)×173 mm (wide W)×10 mm (high H), whereas its volume is 299 cm$^3$. The dispersion compensator M has an accumulated chromatic dispersion of −1200 ps/nm, a total dispersion slope of −2.23 ps/nm$^2$, and an insertion loss of 4.9 dB.

Sample 17

The dispersion compensator M of Sample 17 employs a dispersion-compensating optical fiber of type No. 3 having a length of 0.25 km. As in Sample 1, the optical fiber coil 11 is accommodated in the housing 1, and the resin 21 is cured, whereby the optical fiber coil 11 is held. In Sample 17, the dispersion-compensating optical fiber has a glass diameter of 125 μm and a coat diameter of 185 μm. It has a bobbin diameter of 40 mm, a coil outer diameter of 56 mm, and a coil width of 5 mm. The housing 1 prepared has an outer size of 76 mm (long L)×76 mm (wide W)×10 mm (high H) whereas its volume is 58 cm$^3$. The dispersion compensator M has an accumulated chromatic dispersion of −80 ps/nm, a total dispersion slope of −0.15 ps/nm$^2$, and an insertion loss of 2.1 dB.

As in the foregoing, the dispersion compensator M of each of Samples 1 to 17 employs a dispersion-compensating optical fiber having a relatively large absolute value of chromatic dispersion per unit length, i.e., a chromatic dispersion of −140 ps/nm/km or less, thereby realizing a very compact dispersion compensator M.

As can be seen from Samples 1 to 17 mentioned above, it is preferred that, in order for the dispersion compensator M to realize an accumulated chromatic dispersion of −1200 ps/nm or more but less than −600 ps/nm as a dispersion characteristic at a wavelength of 1.55 μm, the dispersion compensator M be constituted by a dispersion-compensating optical fiber having a chromatic dispersion of −140 ps/nm/km or less at a wavelength of 1.55 μm and a housing having a volume of 500 cm$^3$ or less for accommodating the dispersion-compensating optical fiber, and exhibit an insertion loss of 5.9 dB or less at a wavelength of 1.55 μm.

In order for the dispersion compensator M to realize an accumulated chromatic dispersion of −600 ps/nm or more but less than 0 ps/nm as a dispersion characteristic at a wavelength of 1.55 μm, it is preferred that the dispersion compensator M be constituted by a dispersion-compensating optical fiber having a chromatic dispersion of −140 ps/nm/km or less at a wavelength of 1.55 μm and a housing having a volume of 310 cm$^3$ or less for accommodating the dispersion-compensating optical fiber, and exhibit an insertion loss of 3.9 dB or less at a wavelength of 1.55 μm.

In order for the dispersion compensator M to realize an accumulated chromatic dispersion of −300 ps/nm or more but less than 0 ps/nm as a dispersion characteristic at a wavelength of 1.55 μm, it is preferred that the dispersion compensator M be constituted by a dispersion-compensating optical fiber having a chromatic dispersion of −140 ps/nm/km or less at a wavelength of 1.55 μm and a housing having a volume of 260 cm³ or less for accommodating the dispersion-compensating optical fiber, and exhibit an insertion loss of 3.5 dB or less at a wavelength of 1.55 µm.

In order for the dispersion compensator M to realize an accumulated chromatic dispersion of −180 ps/nm or more but less than 0 ps/nm as a dispersion characteristic at a wavelength of 1.55 µm, it is preferred that the dispersion compensator M be constituted by a dispersion-compensating optical fiber having a chromatic dispersion of −140 ps/nm/km or less at a wavelength of 1.55 µm and a housing having a volume of 200 cm³ or less for accommodating the dispersion-compensating optical fiber, and exhibit an insertion loss of 2.4 dB or less at a wavelength of 1.55 µm.

In order for the dispersion compensator M to realize an accumulated chromatic dispersion of −80 ps/nm or more but less than 0 ps/nm as a dispersion characteristic at a wavelength of 1.55 µm, it is preferred that the dispersion compensator M be constituted by a dispersion-compensating optical fiber having a chromatic dispersion of −140 ps/nm/km or less at a wavelength of 1.55 µm and a housing having a volume of 140 cm³ or less for accommodating the dispersion-compensating optical fiber, and exhibit an insertion loss of 2.2 dB or less at a wavelength of 1.55 µm.

Figure 11A:
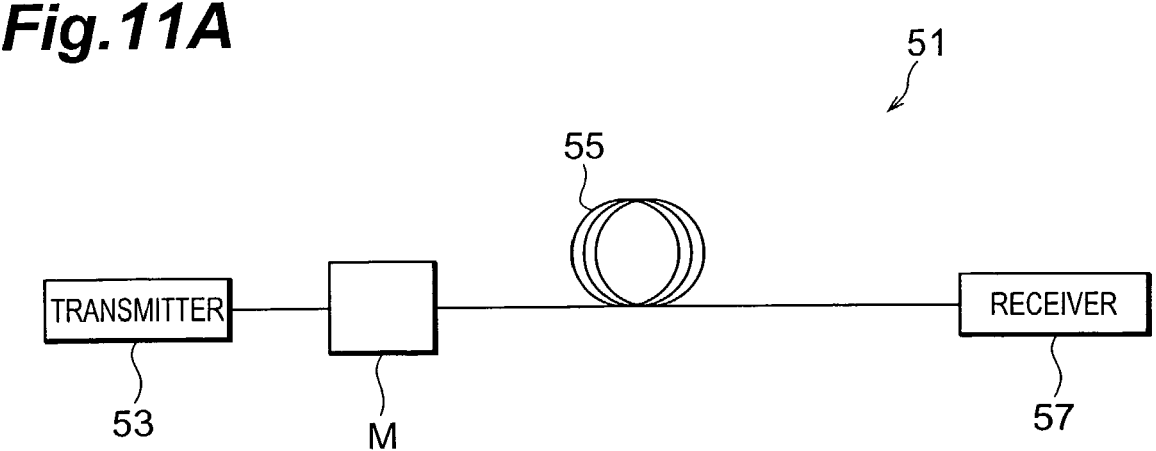
FIGS. 11A and 11B are views showing respective configurations of a first embodiment of the optical transmission system according to the present invention.
Figure 11B:
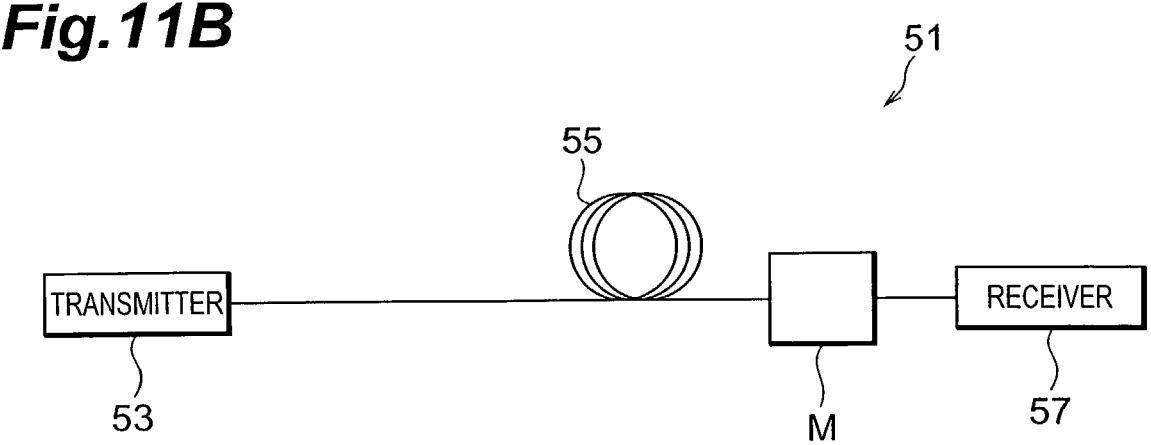
Figure 12A:
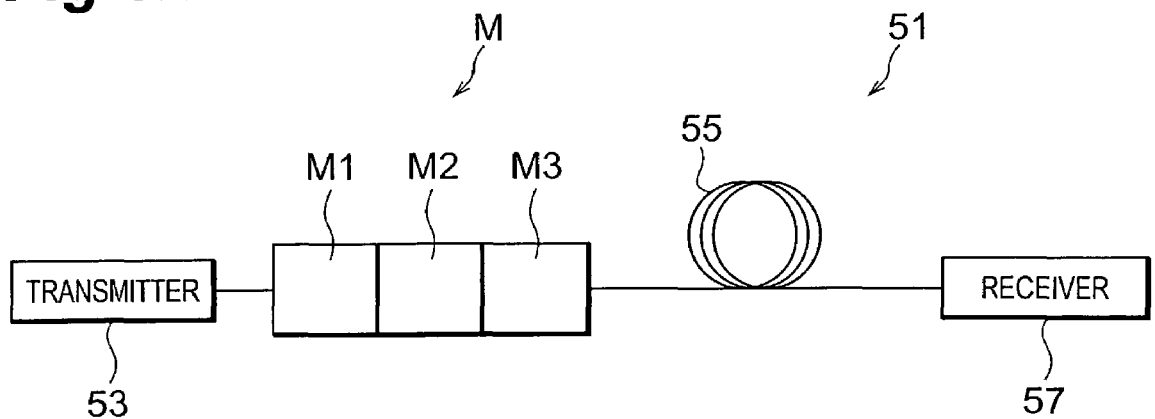
FIGS. 12A and 12B are views showing respective configurations of a second embodiment of the optical transmission system according to the present invention.
Figure 12B:
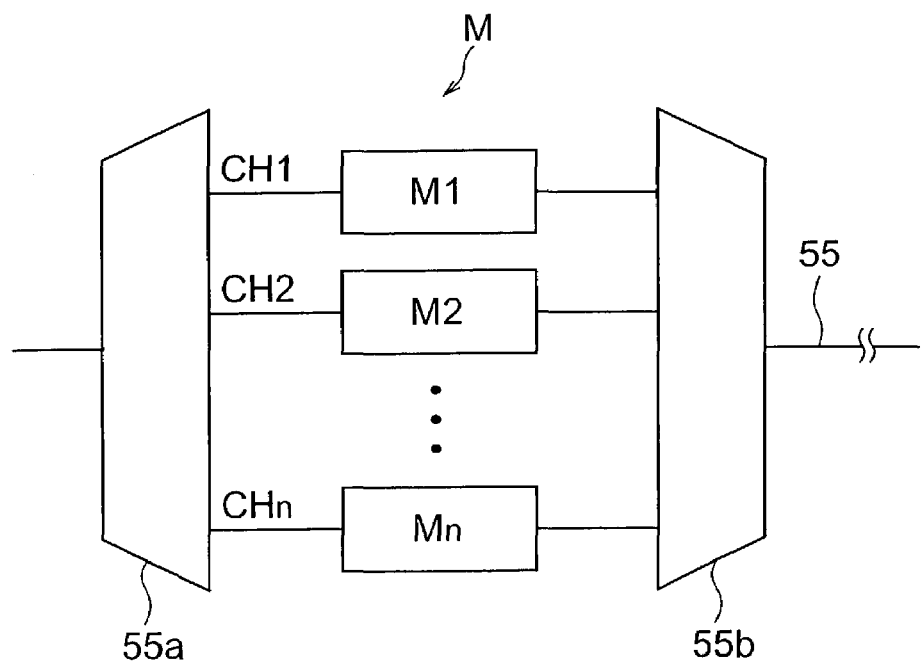
Figure 13:
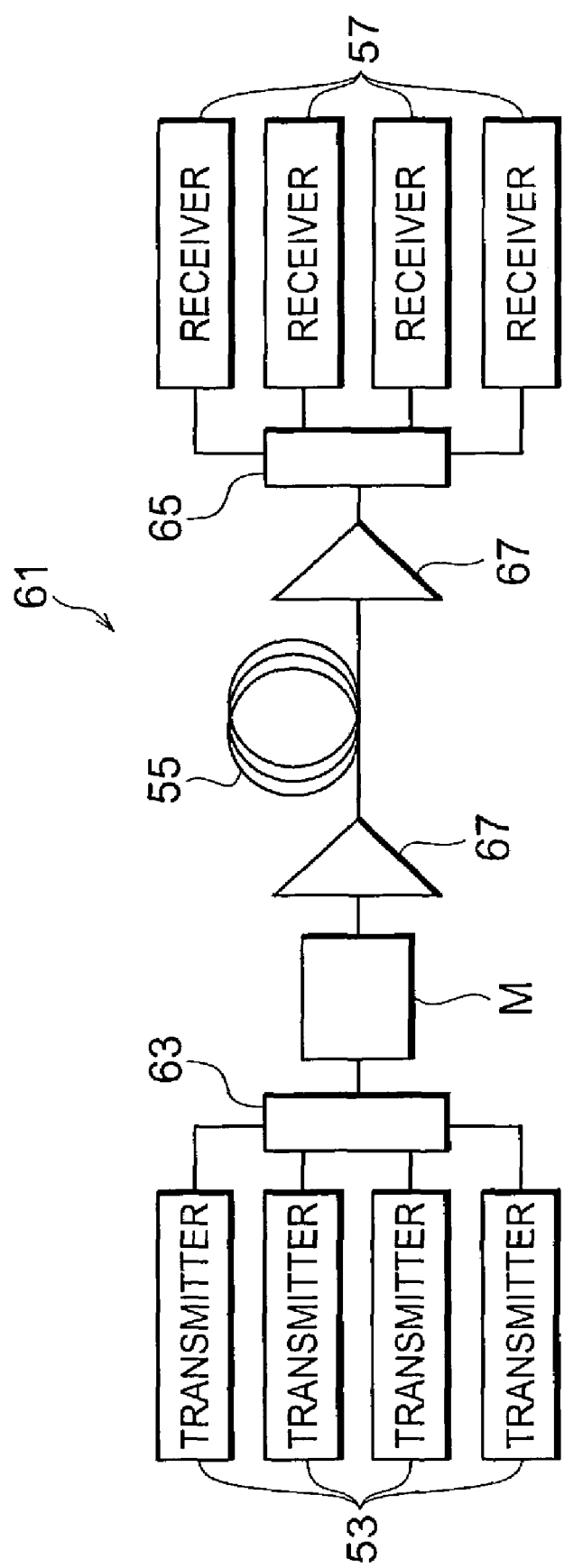
FIG. 13 is a view showing the configuration of a third embodiment of the optical transmission system according to the present invention.

Embodiments of the optical transmission system according to the present invention will now be explained with reference to FIGS. 11A to 12B and 13. FIGS. 11A and 11B show respective configurations of a first embodiment of the optical transmission system according to the present invention. FIGS. 12A and 12B show respective configurations of a second embodiment of the optical transmission system according to the present invention. FIG. 13 shows the configuration of a third embodiment of the optical transmission system according to the present invention.

As shown in FIG. 11A, the optical transmission system 51 according to the first embodiment comprises a transmitter 53 for transmitting multiplexed signal light, a transmission optical fiber 55 through which the signal light propagates, a dispersion compensator M having the structure mentioned above (dispersion compensator according to the present invention), and a receiver 57 for receiving the signal light. In the configuration of FIG. 11A, the dispersion compensator M is connected between the transmitter 53 and the transmission optical fiber 55. The transmission optical fiber 55 has a length of 50 km or shorter, whereas the signal wavelength band is the 1.55-µm band.

Due to such a configuration, in the optical transmission system 51, the chromatic dispersion of the transmission optical fiber 55 is canceled or compensated for by the dispersion compensator M, so that the absolute value of chromatic dispersion in the whole optical transmission line between the transmitter 53 and receiver 57 becomes smaller, whereby the waveform of signal light is effectively restrained from deteriorating.

In the optical transmission system 51 according to the first embodiment, the dispersion compensator M may be connected between the receiver 57 and the transmission optical fiber 55 as shown in FIG. 11B. Alternatively, the dispersion compensator M may be connected to an optical amplifier employing an erbium doped optical fiber or the like.

The dispersion compensator M may be constituted by a plurality of dispersion compensating modules each having the structure mentioned above (shown in FIGS. 1 to 6). In the optical transmission system 51 according to the second embodiment, as shown in FIG. 12A, the dispersion compensator M may be constructed such that a plurality of dispersion compensating modules M1 to M3 are connected in series, so as to regulate chromatic dispersion values.

When a plurality of dispersion compensating modules M1 to M3 are connected in series as such, the dispersion compensating modules M1 to M3 may have either identical or different chromatic dispersion values. A plurality of dispersion compensating modules M1 to M3 may be disposed on the receiver 57 side of the transmission optical fiber 55 as a matter of course.

In the optical transmission system 51 according to the second embodiment, as shown in FIG. 12B, an optical demultiplexer 55a for separating multiplexed signal light into individual signal channels and an optical multiplexer 55b for combining the individual signal channels of light are disposed on a signal light propagating line, whereas a plurality of dispersion compensating modules M1 to Mn corresponding to the respective signal channels are disposed between the optical demultiplexer 55a and the optical multiplexer 55b, so as to construct the dispersion compensator M. Since the dispersion compensating modules M1 to Mn are arranged in parallel as such, it will be sufficient if the individual dispersion compensating modules compensate for their corresponding signal channels, whereby it is unnecessary for the dispersion compensating modules M1 to Mn to have a large dispersion slope.

As shown in FIG. 13, the optical transmission system 61 according to a third embodiment includes a plurality of transmitters 53 and a plurality of receivers 57, and further comprises an optical multiplexer 63 for combining a plurality of signal light components transmitted from the respective transmitters 53, and an optical demultiplexer 65 for separating thus multiplexed signal light into a plurality of signal light components. In this optical transmission system 61, though optical amplifiers 67 are connected to the upstream stage (on the transmitter 53 side) and downstream stage (on the receiver 57 side) of the transmission optical fiber 55, respectively, they may be connected to one or none of these stages as well. The signal wavelength band is the 1.55-µm band in the optical transmission system 61 as well.

The dispersion compensator according to the present invention is not restricted to the above-mentioned embodiments. For example, the housing 1 may have a polygonal form without being restricted to the doughnut form (including a circular form) or square form (rectangular form).

Also, the dispersion compensator according to the present invention can attain a further compactness by improving the dispersion-compensating optical fiber employed therein.

FIG. 14 is a table for explaining structures and various characteristics of optical fibers of types No. 4 to No. 10 prepared as examples of the dispersion-compensating optical fiber (optical fiber according to the present invention) employable in the dispersion compensator according to the present invention. Each of the optical fibers of types No. 4 to No. 10 has the triple cladding type refractive index profile shown in FIGS. 9A and 9B.

In the optical fiber of type No. 4 among the prepared optical fibers, the relative refractive index difference $\Delta 1$ of the center core part 211 with reference to the third cladding part 214 is 2.4%, the relative refractive index difference $\Delta 2$ of the first cladding part 212 with reference to the third cladding part 214 is −0.6%, the relative refractive index difference $\Delta 3$ of the second cladding part 213 with reference to the third cladding part 214 is 0.6%, the ratio Ra (=a/c) of the outer diameter $2a$ of the center core part 211 to the outer diameter $2c$ of the second cladding part 213 is 0.30, and the Rb (=b/c) of the outer diameter $2b$ of the first cladding core part 212 to the outer diameter $2c$ of the second cladding part 213 is 0.7. The outer diameter $2c$ of the second cladding part 213 in type No. 4 is 11.1 µm. As characteristics at a wavelength of 1550 nm, type No. 4 has a chromatic dispersion of −158 ps/nm/km, a dispersion slope of −0.193 ps/nm²/km, and an effective area $A_{eff}$ of 16.4 μm². Further, type No. 4 has a cutoff wavelength of 1.372 μm, whereas its maximum change of chromatic dispersion at the time when the outer diameter 2c of the second cladding part 213 fluctuates by ±2% is 8.6%.

Here, as shown in Japanese Patent Application Laid-Open No. HEI 8-248251 (EP 0 724 171 A2), the above-mentioned effective area $A_{eff}$ is given by the following expression:

$$A_{eff} = 2\pi \left( \int_0^\infty E^2 r\, dr \right)^2 \Big/ \left( \int_0^\infty E^4 r\, dr \right)$$

where E is the electric field accompanying the propagating light, and r is the radial distance from the center of the core region.

In the optical fiber of type No. 5, the relative refractive index difference Δ1 of the center core part 211 with reference to the third cladding part 214 is 2.4%, the relative refractive index difference Δ2 of the first cladding part 212 with reference to the third cladding part 214 is −0.7%, the relative refractive index difference Δ3 of the second cladding part 213 with reference to the third cladding part 214 is 0.6%, the ratio Ra (=a/c) of the outer diameter 2a of the center core part 211 to the outer diameter 2c of the second cladding part 213 is 0.33, and the Rb (=b/c) of the outer diameter 2b of the first cladding core part 212 to the outer diameter 2c of the second cladding part 213 is 0.7. The outer diameter 2c of the second cladding part 213 in type No. 5 is 10.0 μm. As characteristics at a wavelength of 1550 nm, type No. 5 has a chromatic dispersion of −165 ps/nm/km, a dispersion slope of 0.117 ps/nm²/km, and an effective area $A_{eff}$ of 19.4 μm². Further, type No. 5 has a cutoff wavelength of 1.218 μm, whereas its maximum change of chromatic dispersion at the time when the outer diameter 2c of the second cladding part 213 fluctuates by ±2% is 4.2%.

In the optical fiber of type No. 6, the relative refractive index difference Δ1 of the center core part 211 with reference to the third cladding part 214 is 2.7%, the relative refractive index difference Δ2 of the first cladding part 212 with reference to the third cladding part 214 is −0.5%, the relative refractive index difference Δ3 of the second cladding part 213 with reference to the third cladding part 214 is 0.6%, the ratio Ra (=a/c) of the outer diameter 2a of the center core part 211 to the outer diameter 2c of the second cladding part 213 is 0.26, and the Rb (=b/c) of the outer diameter 2b of the first cladding core part 212 to the outer diameter 2c of the second cladding part 213 is 0.7. The outer diameter 2c of the second cladding part 213 in type No. 6 is 11.4 μm. As characteristics at a wavelength of 1550 nm, type No. 6 has a chromatic dispersion of −184 ps/nm/km, a dispersion slope of −0.197 ps/nm²/km, and an effective area $A_{eff}$ of 15.7 μm². Further, type No. 6 has a cutoff wavelength of 1.438 μm, whereas its maximum change of chromatic dispersion at the time when the outer diameter 2c of the second cladding part 213 fluctuates by ±2% is 8.2%.

In the optical fiber of type No. 7, the relative refractive index difference Δ1 of the center core part 211 with reference to the third cladding part 214 is 2.7%, the relative refractive index difference Δ2 of the first cladding part 212 with reference to the third cladding part 214 is −0.7%, the relative refractive index difference Δ3 of the second cladding part 213 with reference to the third cladding part 214 is 0.6%, the ratio Ra (=a/c) of the outer diameter 2a of the center core part 211 to the outer diameter 2c of the second cladding part 213 is 0.30, and the Rb (=b/c) of the outer diameter 2b of the first cladding core part 212 to the outer diameter 2c of the second cladding part 213 is 0.7. The outer diameter 2c of the second cladding part 213 in type No. 7 is 10.0 μm. As characteristics at a wavelength of 1550 nm, type No. 7 has a chromatic dispersion of −206 ps/nm/km, a dispersion slope of 0.091 ps/nm²/km, and an effective area $A_{eff}$ of 17.9 μm². Further, type No. 7 has a cutoff wavelength of 1.216 μm, whereas its maximum change of chromatic dispersion at the time when the outer diameter 2c of the second cladding part 213 fluctuates by ±2% is 5.2%.

In the optical fiber of type No. 8, the relative refractive index difference Δ1 of the center core part 211 with reference to the third cladding part 214 is 3.0%, the relative refractive index difference Δ2 of the first cladding part 212 with reference to the third cladding part 214 is −0.5%, the relative refractive index difference Δ3 of the second cladding part 213 with reference to the third cladding part 214 is 0.6%, the ratio Ra (=a/c) of the outer diameter 2a of the center core part 211 to the outer diameter 2c of the second cladding part 213 is 0.24, and the Rb (=b/c) of the outer diameter 2b of the first cladding core part 212 to the outer diameter 2c of the second cladding part 213 is 0.7. The outer diameter 2c of the second cladding part 213 in type No. 8 is 11.1 μm. As characteristics at a wavelength of 1550 nm, type No. 8 has a chromatic dispersion of −230 ps/nm/km, a dispersion slope of 0.120 ps/nm²/km, and an effective area $A_{eff}$ of 17.5 μm². Further, type No. 8 has a cutoff wavelength of 1.400 μm, whereas its maximum change of chromatic dispersion at the time when the outer diameter 2c of the second cladding part 213 fluctuates by ±2% is 4.7%.

In the optical fiber of type No. 9, the relative refractive index difference Δ1 of the center core part 211 with reference to the third cladding part 214 is 3.0%, the relative refractive index difference Δ2 of the first cladding part 212 with reference to the third cladding part 214 is −0.7%, the relative refractive index difference Δ3 of the second cladding part 213 with reference to the third cladding part 214 is 0.6%, the ratio Ra (=a/c) of the outer diameter 2a of the center core part 211 to the outer diameter 2c of the second cladding part 213 is 0.26, and the Rb (=b/c) of the outer diameter 2b of the first cladding core part 212 to the outer diameter 2c of the second cladding part 213 is 0.7. The outer diameter 2c of the second cladding part 213 in type No. 9 is 10.7 μm. As characteristics at a wavelength of 1550 nm, type No. 9 has a chromatic dispersion of −267 ps/nm/km, a dispersion slope of −0.378 ps/nm²/km, and an effective area $A_{eff}$ of 15.2 μm². Further, type No. 9 has a cutoff wavelength of 1.295 μm, whereas its maximum change of chromatic dispersion at the time when the outer diameter 2c of the second cladding part 213 fluctuates by ±2% is 10.3%.

In the optical fiber of type No. 10, the relative refractive index difference Δ1 of the center core part 211 with reference to the third cladding part 214 is 3.1%, the relative refractive index difference Δ2 of the first cladding part 212 with reference to the third cladding part 214 is −0.74%, the relative refractive index difference Δ3 of the second cladding part 213 with reference to the third cladding part 214 is 0.32%, the ratio Ra (=a/c) of the outer diameter 2a of the center core part 211 to the outer diameter 2c of the second cladding part 213 is 0.19, and the Rb (=b/c) of the outer diameter 2b of the first cladding core part 212 to the outer diameter 2c of the second cladding part 213 is 0.44. The outer diameter 2c of the second cladding part 213 in type No. 10 is 14.7 μm. As characteristics at a wavelength of 1550 nm, type No. 10 has achromatic dispersion of −321 ps/nm/km, a dispersion slope of −0.132 ps/nm²/km, and an effective area $A_{eff}$ of 16.6 µm². Further, type No. 10 has a cutoff wavelength of 1.706 µm, whereas its maximum change of chromatic dispersion at the time when the outer diameter 2c of the second cladding part 213 fluctuates by ±2% is 10.8%.

Figure 15:
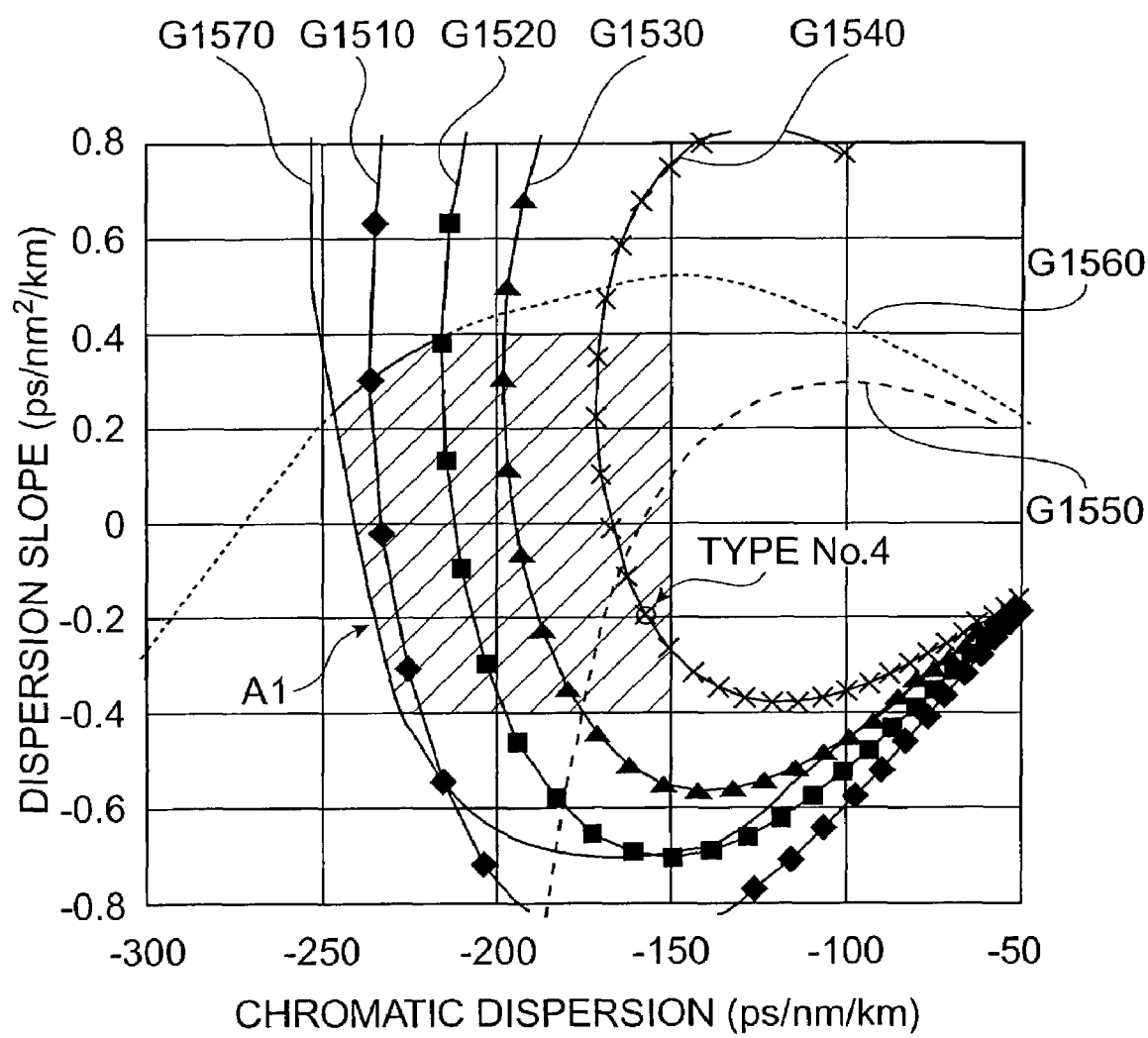
FIG. 15 is a graph showing relationships between the chromatic dispersion and dispersion slope in the optical fiber of type No. 4.

FIG. 15 is a graph showing relationships between the chromatic dispersion and dispersion slope in the above-mentioned type No. 4. In particular, this graph shows relationships between the chromatic dispersion and dispersion slope obtained when 2c is changed while fixing Δ1, Δ2, and Δ3 to 2.4%, −0.6%, and 0.6%, respectively, and Ra, Rb, bending loss, and cutoff wavelength to their predetermined values. In FIG. 15, curve G1510 shows the relationship between chromatic dispersion and dispersion slope obtained when Ra and Rb are fixed at 0.26 and 0.70, respectively; curve G1520 shows the relationship between chromatic dispersion and dispersion slope obtained when Ra and Rb are fixed at 0.27 and 0.70, respectively; curve G1530 shows the relationship between chromatic dispersion and dispersion slope obtained when Ra and Rb are fixed at 0.28 and 0.70, respectively; curve G1540 shows the relationship between chromatic dispersion and dispersion slope obtained when Ra and Rb are fixed at 0.30 and 0.70, respectively; curve G1550 shows the relationship between chromatic dispersion and dispersion slope obtained when the bending loss at a diameter of 40 mm is fixed at 0.01 dB/km; curve G1560 shows the relationship between chromatic dispersion and dispersion slope obtained when the bending loss at a diameter of 60 mm is fixed at 0.01 dB/km; and curve G1570 shows the relationship between chromatic dispersion and dispersion slope obtained when the cutoff wavelength is fixed at 1550 nm.

In FIG. 15, hatched area A1 is a region indicating the optimal conditions for optical fibers employable in the dispersion compensator according to the present invention. It is seen that this area A1 includes the above-mentioned type No. 4.

Figure 16:
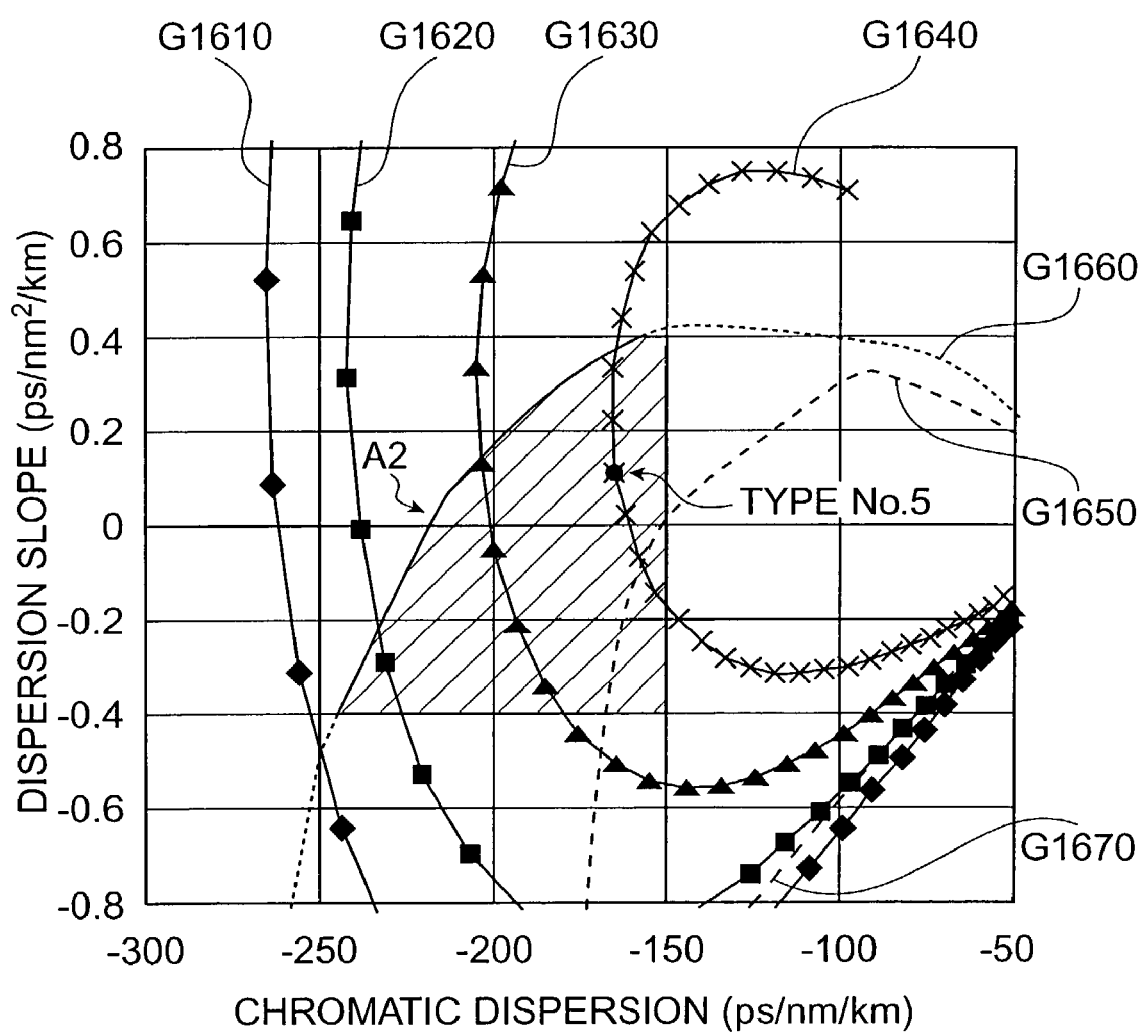
FIG. 16 is a graph showing relationships between the chromatic dispersion and dispersion slope in the optical fiber of type No. 5.

FIG. 16 is a graph showing relationships between the chromatic dispersion and dispersion slope in the above-mentioned type No. 5. In particular, this graph shows relationships between the chromatic dispersion and dispersion slope obtained when 2c is changed while fixing Δ1, Δ2, and Δ3 to 2.4%, −0.7%, and 0.6%, respectively, and Ra, Rb, bending loss, and cutoff wavelength to their predetermined values. In FIG. 16, curve G1610 shows the relationship between chromatic dispersion and dispersion slope obtained when Ra and Rb are fixed at 0.27 and 0.70, respectively; curve G1620 shows the relationship between chromatic dispersion and dispersion slope obtained when Ra and Rb are fixed at 0.28 and 0.70, respectively; curve G1630 shows the relationship between chromatic dispersion and dispersion slope obtained when Ra and Rb are fixed at 0.30 and 0.70, respectively; curve G1640 shows the relationship between chromatic dispersion and dispersion slope obtained when Ra and Rb are fixed at 0.33 and 0.70, respectively; curve G1650 shows the relationship between chromatic dispersion and dispersion slope obtained when the bending loss at a diameter of 40 mm is fixed at 0.01 dB/km; curve G1660 shows the relationship between chromatic dispersion and dispersion slope obtained when the bending loss at a diameter of 60 mm is fixed at 0.01 dB/km; and curve G1670 shows the relationship between chromatic dispersion and dispersion slope obtained when the cutoff wavelength is fixed at 1550 nm.

In FIG. 16, hatched area A2 is a region indicating the optimal conditions for optical fibers employable in the dispersion compensator according to the present invention. It is seen that this area A2 includes the above-mentioned type No. 5.

Figure 17:
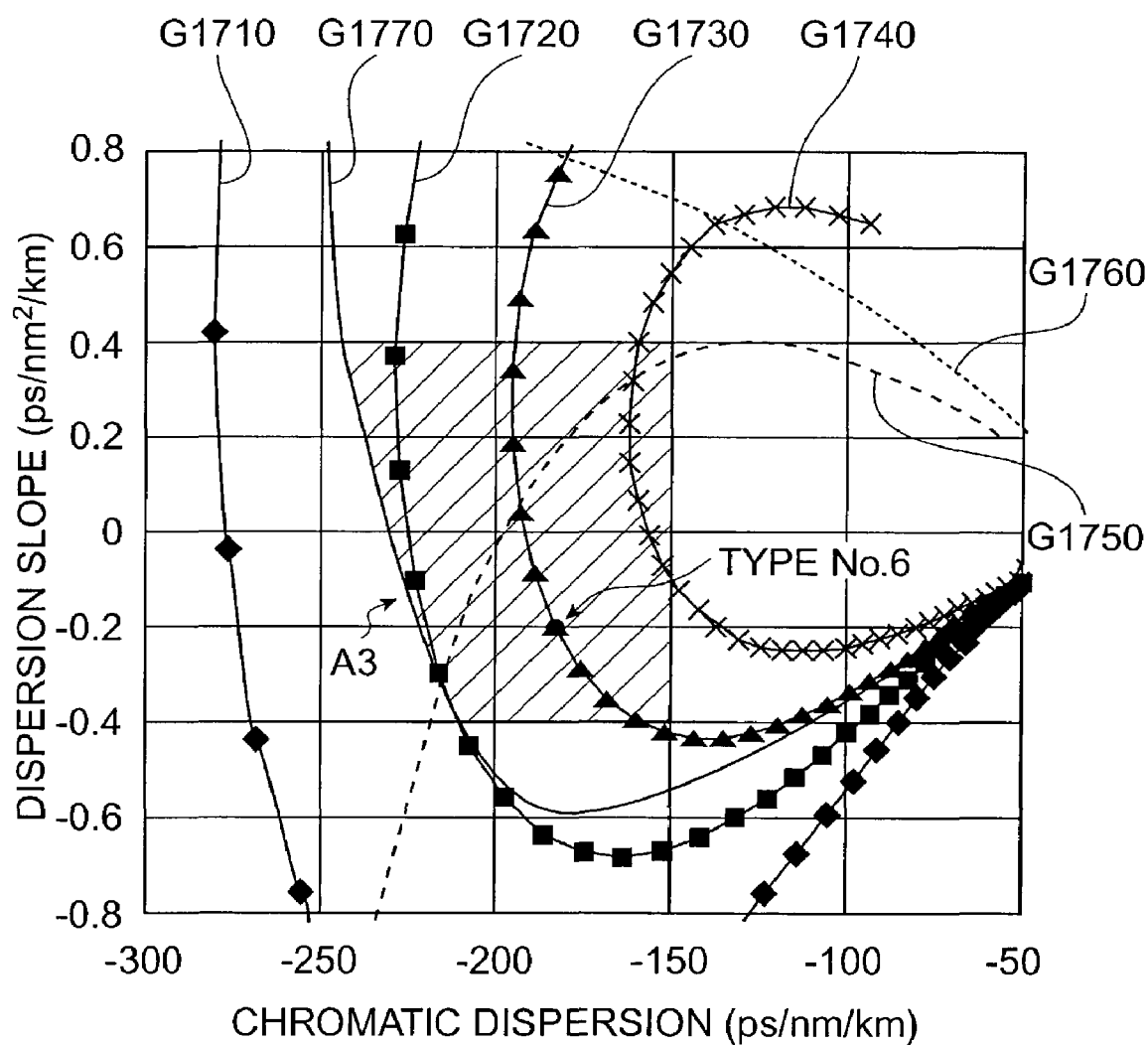
FIG. 17 is a graph showing relationships between the chromatic dispersion and dispersion slope in the optical fiber of type No. 6.

FIG. 17 is a graph showing relationships between the chromatic dispersion and dispersion slope in the above-mentioned type No. 6. In particular, this graph shows relationships between the chromatic dispersion and dispersion slope obtained when 2c is changed while fixing Δ1, Δ2, and Δ3 to 2.7%, −0.5%, and 0.6%, respectively, and Ra, Rb, bending loss, and cutoff wavelength to their predetermined values. In FIG. 17, curve G1710 shows the relationship between chromatic dispersion and dispersion slope obtained when Ra and Rb are fixed at 0.22 and 0.70, respectively; curve G1720 shows the relationship between chromatic dispersion and dispersion slope obtained when Ra and Rb are fixed at 0.24 and 0.70, respectively; curve G1730 shows the relationship between chromatic dispersion and dispersion slope obtained when Ra and Rb are fixed at 0.26 and 0.70, respectively; curve G1740 shows the relationship between chromatic dispersion and dispersion slope obtained when Ra and Rb are fixed at 0.29 and 0.70, respectively; curve G1750 shows the relationship between chromatic dispersion and dispersion slope obtained when the bending loss at a diameter of 40 mm is fixed at 0.01 dB/km; curve G1760 shows the relationship between chromatic dispersion and dispersion slope obtained when the bending loss at a diameter of 60 mm is fixed at 0.01 dB/km; and curve G1770 shows the relationship between chromatic dispersion and dispersion slope obtained when the cutoff wavelength is fixed at 1550 nm.

In FIG. 17, hatched area A3 is a region indicating the optimal conditions for optical fibers employable in the dispersion compensator according to the present invention. It is seen that this area A3 includes the above-mentioned type No. 6.

Figure 18:
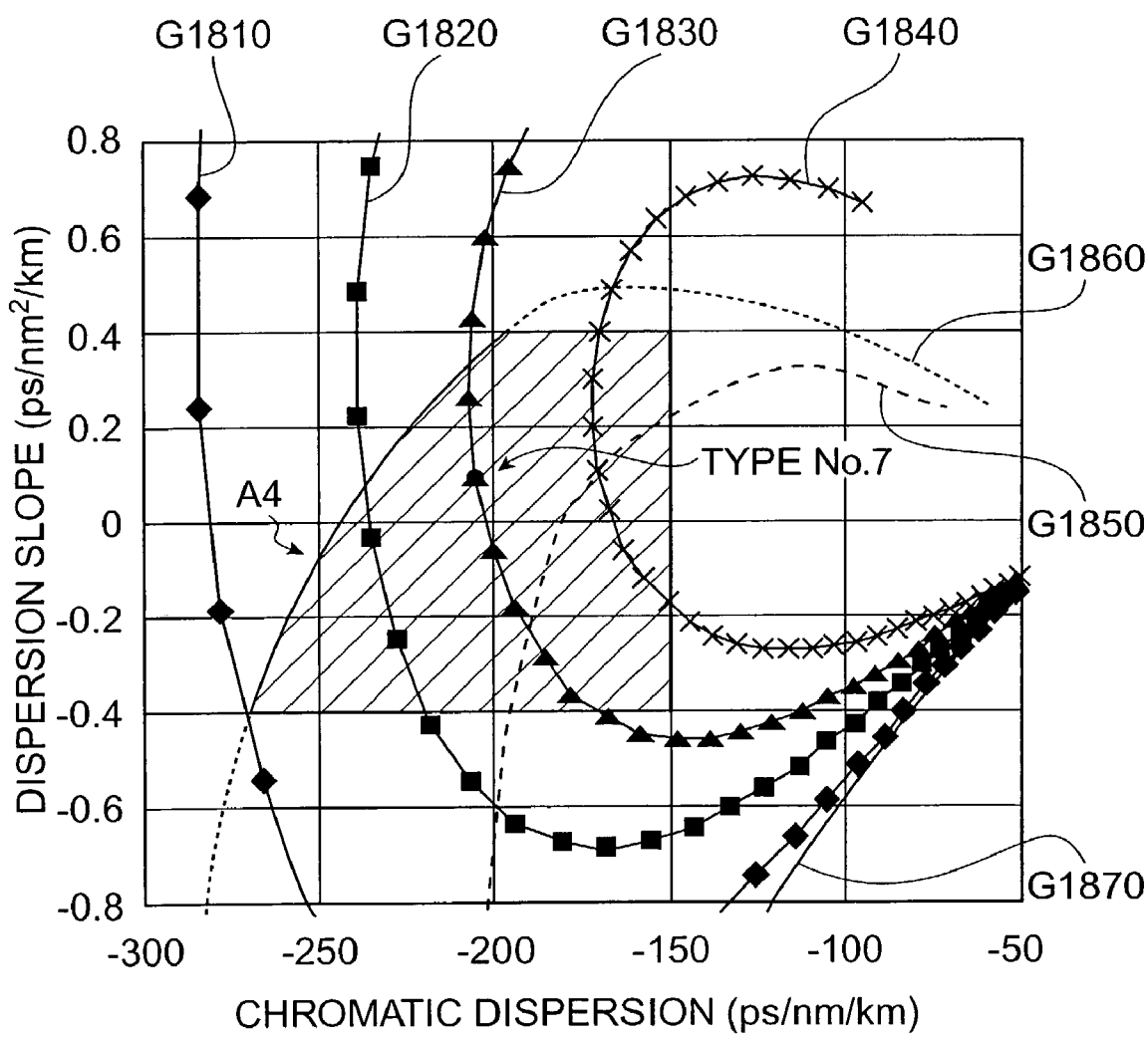
FIG. 18 is a graph showing relationships between the chromatic dispersion and dispersion slope in the optical fiber of type No. 7.

FIG. 18 is a graph showing relationships between the chromatic dispersion and dispersion slope in the above-mentioned type No. 7. In particular, this graph shows relationships between the chromatic dispersion and dispersion slope obtained when 2c is changed while fixing Δ1, Δ2, and Δ3 to 2.7%, −0.7%, and 0.6%, respectively, and Ra, Rb, bending loss, and cutoff wavelength to their predetermined values. In FIG. 18, curve G1810 shows the relationship between chromatic dispersion and dispersion slope obtained when Ra and Rb are fixed at 0.26 and 0.70, respectively; curve G1820 shows the relationship between chromatic dispersion and dispersion slope obtained when Ra and Rb are fixed at 0.28 and 0.70, respectively; curve G1830 shows the relationship between chromatic dispersion and dispersion slope obtained when Ra and Rb are fixed at 0.30 and 0.70, respectively; curve G1840 shows the relationship between chromatic dispersion and dispersion slope obtained when Ra and Rb are fixed at 0.33 and 0.70, respectively; curve G1850 shows the relationship between chromatic dispersion and dispersion slope obtained when the bending loss at a diameter of 40 mm is fixed at 0.01 dB/km; curve G1860 shows the relationship between chromatic dispersion and dispersion slope obtained when the bending loss at a diameter of 60 mm is fixed at 0.01 dB/km; and curve G1870 shows the relationship between chromatic dispersion and dispersion slope obtained when the cutoff wavelength is fixed at 1550 nm.

In FIG. 18, hatched area A4 is a region indicating the optimal conditions for optical fibers employable in the dispersion compensator according to the present invention. It is seen that this area A4 includes various characteristics of the above-mentioned type No. 7.

Figure 19:
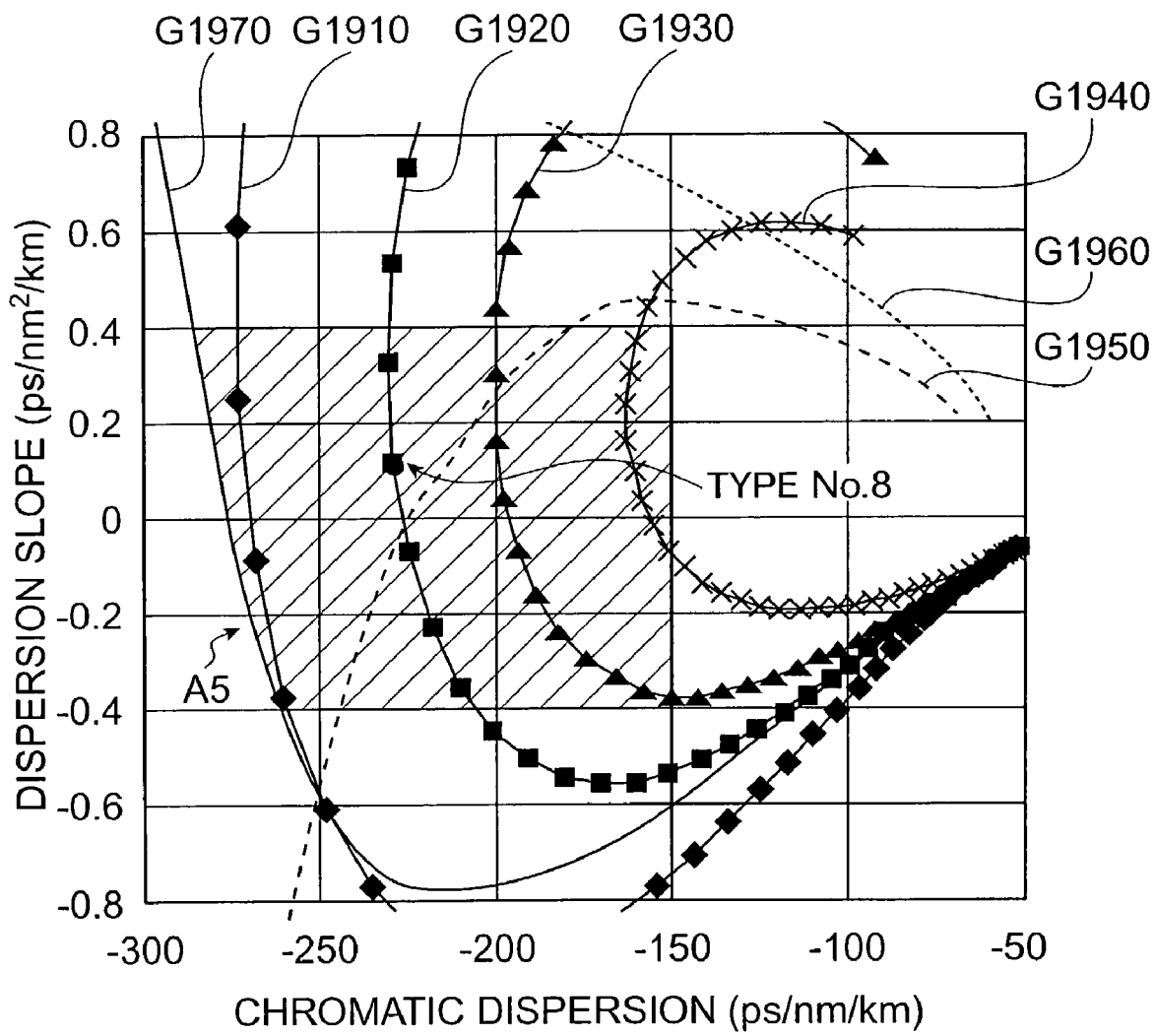
FIG. 19 is a graph showing relationships between the chromatic dispersion and dispersion slope in the optical fiber of type No. 8.

FIG. 19 is a graph showing relationships between the chromatic dispersion and dispersion slope in the above-mentioned type No. 8. In particular, this graph shows relationships between the chromatic dispersion and dispersion slope obtained when $2c$ is changed while fixing $\Delta 1$, $\Delta 2$, and $\Delta 3$ to 3.0%, −0.5%, and 0.6%, respectively, and Ra, Rb, bending loss, and cutoff wavelength to their predetermined values. In FIG. 19, curve G1910 shows the relationship between chromatic dispersion and dispersion slope obtained when Ra and Rb are fixed at 0.22 and 0.70, respectively; curve G1920 shows the relationship between chromatic dispersion and dispersion slope obtained when Ra and Rb are fixed at 0.24 and 0.70, respectively; curve G1930 shows the relationship between chromatic dispersion and dispersion slope obtained when Ra and Rb are fixed at 0.26 and 0.70, respectively; curve G1940 shows the relationship between chromatic dispersion and dispersion slope obtained when Ra and Rb are fixed at 0.30 and 0.70, respectively; curve G1950 shows the relationship between chromatic dispersion and dispersion slope obtained when the bending loss at a diameter of 40 mm is fixed at 0.01 dB/km; curve G1960 shows the relationship between chromatic dispersion and dispersion slope obtained when the bending loss at a diameter of 60 mm is fixed at 0.01 dB/km; and curve G1970 shows the relationship between chromatic dispersion and dispersion slope obtained when the cutoff wavelength is fixed at 1550 nm.

In FIG. 19, hatched area A5 is a region indicating the optimal conditions for optical fibers employable in the dispersion compensator according to the present invention. It is seen that this area A5 includes various characteristics of the above-mentioned type No. 8.

Figure 20:
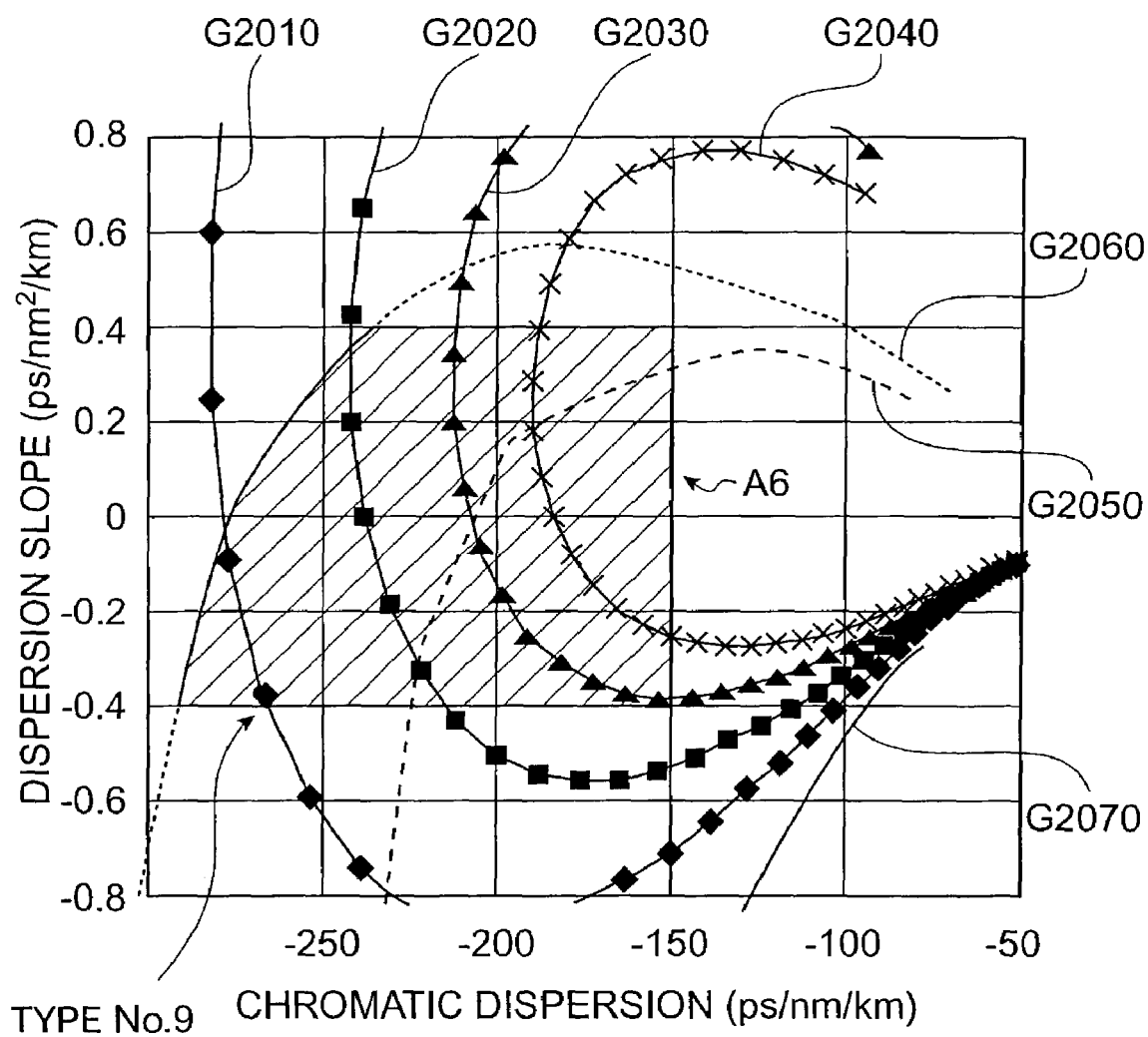
FIG. 20 is a graph showing relationships between the chromatic dispersion and dispersion slope in the optical fiber of type No. 9.

FIG. 20 is a graph showing relationships between the chromatic dispersion and dispersion slope in the above-mentioned type No. 9. In particular, this graph shows relationships between the chromatic dispersion and dispersion slope obtained when $2c$ is changed while fixing $\Delta 1$, $\Delta 2$, and $\Delta 3$ to 3.0%, −0.7%, and 0.6%, respectively, and Ra, Rb, bending loss, and cutoff wavelength to their predetermined values. In FIG. 20, curve G2010 shows the relationship between chromatic dispersion and dispersion slope obtained when Ra and Rb are fixed at 0.26 and 0.70, respectively; curve G2020 shows the relationship between chromatic dispersion and dispersion slope obtained when Ra and Rb are fixed at 0.28 and 0.70, respectively; curve G2030 shows the relationship between chromatic dispersion and dispersion slope obtained when Ra and Rb are fixed at 0.30 and 0.70, respectively; curve G2040 shows the relationship between chromatic dispersion and dispersion slope obtained when Ra and Rb are fixed at 0.32 and 0.70, respectively; curve G2050 shows the relationship between chromatic dispersion and dispersion slope obtained when the bending loss at a diameter of 40 mm is fixed at 0.01 dB/km; curve G2060 shows the relationship between chromatic dispersion and dispersion slope obtained when the bending loss at a diameter of 60 mm is fixed at 0.01 dB/km; and curve G2070 shows the relationship between chromatic dispersion and dispersion slope obtained when the cutoff wavelength is fixed at 1550 nm.

In FIG. 20, hatched area A6 is a region indicating the optimal conditions for optical fibers employable in the dispersion compensator according to the present invention. It is seen that this area A6 includes various characteristics of the above-mentioned type No. 9.

Figure 21:
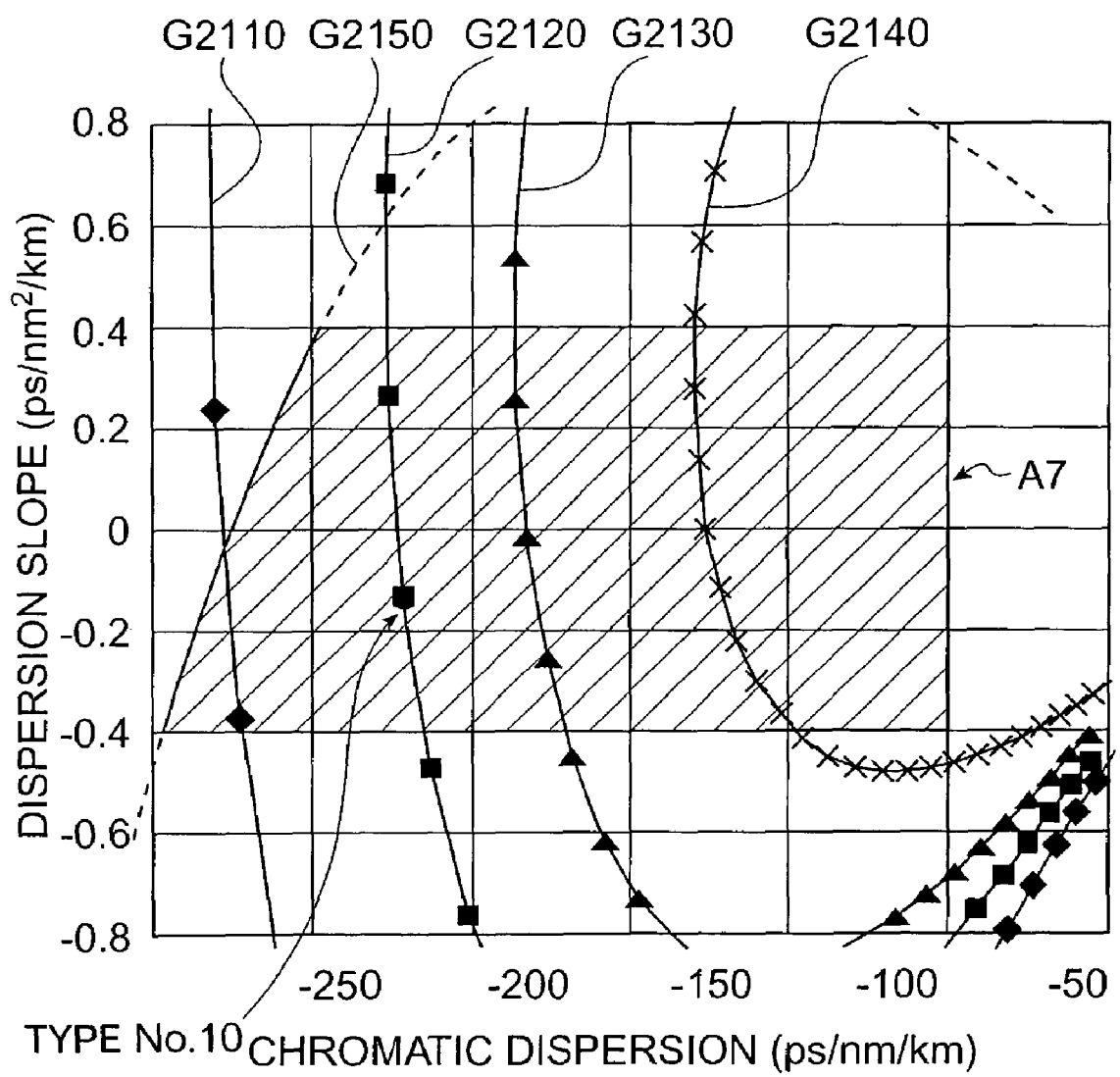
FIG. 21 is a graph showing relationships between the chromatic dispersion and dispersion slope in the optical fiber of type No. 10.

FIG. 21 is a graph showing relationships between the chromatic dispersion and dispersion slope in the above-mentioned type No. 10. In particular, this graph shows relationships between the chromatic dispersion and dispersion slope obtained when $2c$ is changed while fixing $\Delta 1$, $\Delta 2$, and $\Delta 3$ to 3.1%, −0.74%, and 0.32%, respectively, and Ra, Rb, bending loss, and cutoff wavelength to their predetermined values. In FIG. 21, curve G2110 shows the relationship between chromatic dispersion and dispersion slope obtained when Ra and Rb are fixed at 0.18 and 0.44, respectively; curve G2120 shows the relationship between chromatic dispersion and dispersion slope obtained when Ra and Rb are fixed at 0.19 and 0.44, respectively; curve G2130 shows the relationship between chromatic dispersion and dispersion slope obtained when Ra and Rb are fixed at 0.20 and 0.44, respectively; curve G2140 shows the relationship between chromatic dispersion and dispersion slope obtained when Ra and Rb are fixed at 0.22 and 0.44, respectively; and curve G2150 shows the relationship between chromatic dispersion and dispersion slope obtained when the bending loss at a diameter of 40 mm is fixed at 0.01 dB/km.

In FIG. 21, hatched area A7 is a region indicating the optimal conditions for optical fibers employable in the dispersion compensator according to the present invention. It is seen that this area A7 includes various characteristics of the above-mentioned type No. 10.

The inventors have verified that a dispersion compensator having an accumulated chromatic dispersion of −390 to 0 ps/nm at a wavelength of 1.55 μm and an outer size of 110 mm×110 mm×18 mm (long L×wide W×high H) can be obtained when the above-mentioned types No. 4 to No. 10 are employed in the dispersion compensator according to the present invention, whereas an accumulated chromatic dispersion of −640 to 0 ps/nm at a wavelength of 1.55 μm and an outer size of 110 mm×110 mm×18 mm (long L×wide W×high H) can be obtained when a dispersion-compensating optical fiber having a coating layer with an outer diameter of 145 μm or less is employed. The inventors have also verified that a dispersion compensator having an accumulated chromatic dispersion of −270 to 0 ps/nm at a wavelength of 1.55 μm and an outer size of 110 mm×110 mm×14 mm (long L×wide W×high H) can be obtained when the above-mentioned types No. 4 to No. 10 are employed in the dispersion compensator, whereas an accumulated chromatic dispersion of −440 to 0 ps/nm at a wavelength of 1.55 μm and an outer size of 110 mm×110 mm×14 mm (long L×wide W×high H) can be obtained when a dispersion-compensating optical fiber having a coating layer with an outer diameter of 145 μm or less is employed, thus achieving a further compactness.

As explained in the foregoing, the present invention is effective in that a compact dispersion compensator, an optical transmission system including the same, and an optical fiber which can make the dispersion compensator further compact are obtained.

What is claimed is:

1. A dispersion compensator comprising:
   a dispersion-compensating optical fiber having a chromatic dispersion of −140 ps/nm/km or less at a wavelength of 1.55 μm, and a mode field diameter of 5 μm or less at the wavelength of 1.55 μm;
   a housing having a volume of 500 cm³ or less for accommodating said dispersion-compensating optical fiber; and
   an accumulated chromatic dispersion of −1200 ps/nm or more but less than −600 ps/nm at a wavelength of 1.55 μm,
   wherein said dispersion-compensating optical fiber comprises a center core part extending along a predetermined axis and having a predetermined maximum refractive index, and a cladding part, provided on an outer periphery of said center core part, having a refractive index lower than that of said center core part, and wherein said center core part has a relative refractive index difference of 2.4% or more with reference to the refractive index of said cladding part.

2. A dispersion compensator according to claim 1, wherein said dispersion-compensating optical fiber further comprises a coating layer, provided on an outer periphery of said cladding part, having an outer diameter of 185 μm or less.

3. A dispersion compensator according to claim 2, wherein said coating layer of said dispersion-compensating optical fiber has an outer diameter of 145 μm or less.

4. A dispersion compensator according to claim 1, wherein said dispersion-compensating optical fiber has a chromatic dispersion of −220 ps/nm/km or less at a wavelength of 1.55 μm.

5. A dispersion compensator according to claim 1, wherein said dispersion-compensating optical fiber is accommodated in said housing while in a state wound about a bobbin.

6. A dispersion compensator according to claim 1, wherein said dispersion-compensating optical fiber is wound like a coil and accommodated in said housing while in a state where said coil form is maintained.

7. A dispersion compensator according to claim 6, wherein said dispersion-compensating optical fiber maintains said coil form with the aid of a resin.

8. A dispersion compensator according to claim 5, wherein said dispersion-compensating optical fiber is wound like a coil with an inner diameter of less than 60 mm.

9. An optical transmission system comprising:
a transmitter for transmitting signal light;
a transmission optical fiber for propagating said signal light;
a dispersion compensator according to claim 1; and
a receiver for receiving said signal light.

10. A dispersion compensator according to claim 1, wherein said dispersion-compensating optical fiber has the mode field diameter of 4.5 μm or less at the wavelength of 1.55 μm.

11. A dispersion compensator comprising:
a dispersion-compensating optical fiber having a chromatic dispersion of −140 ps/nm/km or less at a wavelength of 1.55 μm. and a mode field diameter of 5 μm or less at the wavelength of 1.55 μm;
a housing having a volume of 310 cm$^3$ or less for accommodating said dispersion-compensating optical fiber; and
an accumulated chromatic dispersion of −600 ps/nm or more but less than −300 ps/nm at a wavelength of 1.55 μm,
wherein said dispersion-compensating optical fiber comprises a center core part extending along a predetermined axis and having a predetermined maximum refractive index, and a cladding part, provided on an outer periphery of said center core part, having a refractive index lower than that of said center core part, and
wherein said center core part has a relative refractive index difference of 2.4% or more with reference to the refractive index of said cladding part.

12. A dispersion compensator according to claim 11, wherein said housing has a height of 10 mm or less.

13. A dispersion compensator according to claim 11, wherein said dispersion-compensating optical fiber further comprises a coating layer, provided on an outer periphery of said cladding part, having an outer diameter of 185 μm or less.

14. A dispersion compensator according to claim 13, wherein said coating layer of said dispersion-compensating optical fiber has an outer diameter of 145 μm or less.

15. A dispersion compensator according to claim 11, wherein said dispersion-compensating optical fiber has a chromatic dispersion of −220 ps/nm/km or less at a wavelength of 1.55 μm.

16. A dispersion compensator according to claim 11, wherein said dispersion-compensating optical fiber is accommodated in said housing while in a state wound about a bobbin.

17. A dispersion compensator according to claim 11, wherein said dispersion-compensating optical fiber is wound like a coil and accommodated in said housing while in a state where said coil form is maintained.

18. A dispersion compensator according to claim 17, wherein said dispersion-compensating optical fiber maintains said coil form with the aid of a resin.

19. A dispersion compensator according to claim 16, wherein said dispersion-compensating optical fiber is wound like a coil with an inner diameter of less than 60 mm.

20. An optical transmission system comprising:
a transmitter for transmitting signal light;
a transmission optical fiber for propagating said signal light;
a dispersion compensator according to claim 11; and
a receiver for receiving said signal light.

21. A dispersion compensator according to claim 11, wherein said dispersion-compensating optical fiber has the mode field diameter of 4.5 μm or less at the wavelength of 1.55 μm.

22. A dispersion compensator comprising:
a dispersion-compensating optical fiber having a chromatic dispersion of −140 ps/nm/km or less at a wavelength of 1.55 μm, and a mode field diameter of 5 μm or less at the wavelength of 1.55 μm;
a housing having a volume of 260 cm$^3$ or less for accommodating said dispersion-compensating optical fiber; and
an accumulated chromatic dispersion of −300 ps/nm or more but less than −180 ps/nm at a wavelength of 1.55 μm,
wherein said dispersion-compensating optical fiber comprises a center core part extending along a predetermined axis and having a predetermined maximum refractive index, and a cladding part, provided on an outer periphery of said center core part, having a refractive index lower than that of said center core part, and
wherein said center core part has a relative refractive index difference of 2.4% or more with reference to the refractive index of said cladding part.

23. A dispersion compensator according to claim 22, wherein said housing has a height of 10 mm or less.

24. A dispersion compensator according to claim 22, wherein said dispersion-compensating optical fiber further comprises a coating layer, provided on an outer periphery of said cladding part, having an outer diameter of 185 μm or less.

25. A dispersion compensator according to claim 24, wherein said coating layer of said dispersion-compensating optical fiber has an outer diameter of 145 μm or less.

26. A dispersion compensator according to claim 22, wherein said dispersion-compensating optical fiber has a chromatic dispersion of −220 ps/nm/km or less at a wavelength of 1.55 μm.

27. A dispersion compensator according to claim 22, wherein said dispersion-compensating optical fiber is accommodated in said housing while in a state wound about a bobbin.

28. A dispersion compensator according to claim 22, wherein said dispersion-compensating optical fiber is wound like a coil and accommodated in said housing while in a state where said coil form is maintained.

29. A dispersion compensator according to claim 28, wherein said dispersion-compensating optical fiber maintains said coil form with the aid of a resin.

30. A dispersion compensator according to claim 27, wherein said dispersion-compensating optical fiber is wound like a coil with an inner diameter of less than 60 mm.

31. An optical transmission system comprising:
a transmitter for transmitting signal light;
a transmission optical fiber for propagating said signal light;
a dispersion compensator according to claim 22; and
a receiver for receiving said signal light.

32. A dispersion compensator according to claim 22, wherein said dispersion-compensating optical fiber has the mode field diameter of 4.5 μm or less at the wavelength of 1.55 μm.

33. A dispersion compensator comprising:
a dispersion-compensating optical fiber having a chromatic dispersion of −140 ps/nm/km or less at a wavelength of 1.55 μm, and a mode field diameter of 5 μm or less at the wavelength of 1.55 μm;
a housing having a volume of 200 cm$^3$ or less for accommodating said dispersion-compensating optical fiber; and
an accumulated chromatic dispersion of −180 ps/nm or more but less than −80 ps/nm at a wavelength of 1.55 μm,
wherein said dispersion-compensating optical fiber comprises a center core part extending along a predetermined axis and having a predetermined maximum refractive index, and a cladding part, provided on an outer periphery of said center core part, having a refractive index lower than that of said center core part, and
wherein said center core part has a relative refractive index difference of 2.4% or more with reference to the refractive index of said cladding part.

34. A dispersion compensator according to claim 33, wherein said housing has a height of 10 mm or less.

35. A dispersion compensator according to claim 33, wherein said dispersion-compensating optical fiber further comprises a coating layer, provided on an outer periphery of said cladding part, having an outer diameter of 185 μm or less.

36. A dispersion compensator according to claim 35, wherein said coating layer of said dispersion-compensating optical fiber has an outer diameter of 145 μm or less.

37. A dispersion compensator according to claim 33, wherein said dispersion-compensating optical fiber has a chromatic dispersion of −220 ps/nm/km or less at a wavelength of 1.55 μm.

38. A dispersion compensator according to claim 33, wherein said dispersion-compensating optical fiber is accommodated in said housing while in a state wound about a bobbin.

39. A dispersion compensator according to claim 33, wherein said dispersion-compensating optical fiber is wound like a coil and accommodated in said housing while in a state where said coil form is maintained.

40. A dispersion compensator according to claim 39, wherein said dispersion-compensating optical fiber maintains said coil form with the aid of a resin.

41. A dispersion compensator according to claim 38, wherein said dispersion-compensating optical fiber is wound like a coil with an inner diameter of less than 60 mm.

42. An optical transmission system comprising:
a transmitter for transmitting signal light;
a transmission optical fiber for propagating said signal light;
a dispersion compensator according to claim 33; and
a receiver for receiving said signal light.

43. A dispersion compensator according to claim 33, wherein said dispersion-compensating optical fiber has the mode field diameter of 4.5 μm or less at the wavelength of 1.55 μm.

44. An optical fiber having, as characteristics at a wavelength of 1550 nm,
a chromatic dispersion of −150 ps/nm/km or less;
a bending loss of 0.1 dB/km or less in a state wound at a diameter of 60 mm; and
an effective area of 20 μm$^2$ or less,
wherein said dispersion-compensating optical fiber comprises a center core part extending along a predetermined axis and having a predetermined maximum refractive index and a cladding part, provided on an outer periphery of said center core part, having a refractive index lower than that of said center core part, and
wherein said center core part has a relative refractive index difference of 2.4% or more with reference to the refractive index of said cladding part.

45. An optical fiber according to claim 44, further having, as a characteristic at a wavelength of 1550 nm, a bending loss of 0.01 dB/km or less in a state wound at a diameter of 60 mm.

46. An optical fiber according to claim 44, further having, as a characteristic at a wavelength of 1550 nm, a bending loss of 0.1 dB/km or less in a state wound at a diameter of 40 mm.

47. An optical fiber according to claim 46, further having, as a characteristic at a wavelength of 1550 nm, a bending loss of 0.01 dB/km or less in a state wound at a diameter of 40 mm.

48. An optical fiber according to claim 44, further having a cutoff wavelength of 1.2 μm to 2.0 μm.

49. A dispersion compensator comprising:
an optical fiber according to claim 44;
a housing having an outer size of 110 mm or less×110 mm or less×18 mm or less for accommodating said optical fiber; and
an accumulated chromatic dispersion of −390 to 0 ps/nm at a wavelength of 1.55 μm.

50. A dispersion compensator comprising:
an optical fiber according to claim 44, said optical fiber having a coating layer with an outer diameter of 145 μm or less;
a housing having an outer size of 110mm or less×110mm or less×18 mm or less for accommodating said optical fiber; and
an accumulated chromatic dispersion of −640 to 0 ps/nm at a wavelength of 1.55 μm.

51. A dispersion compensator comprising:
an optical fiber according to claim 44;
a housing having an outer size of 110 mm or less×110 mm or less×14 mm or less for accommodating said optical fiber; and
an accumulated chromatic dispersion of −270 to 0 ps/nm at a wavelength of 1.55 μm.

52. A dispersion compensator comprising:
an optical fiber according to claim 44, said optical fiber having a coating layer with an outer diameter of 145 μm or less;
a housing having an outer size of 110 mm or less×110 mm or less×14 mm or less for accommodating said optical fiber; and
an accumulated chromatic dispersion of −440 to 0 ps/nm at a wavelength of 1.55 μm.

53. An optical fiber having, as characteristics at a wavelength of 1550 nm,
a chromatic dispersion of −150 ps/nm/km or less;
a bending loss of 0.1 dB/km or less in a state wound at a diameter of 60 mm; and
a dispersion slope with an absolute value of 0.4 ps/nm$^2$/km or less,
wherein said dispersion-compensating optical fiber comprises a center core part extending along a predetermined axis and having a predetermined maximum refractive index, and a cladding part, provided on an outer periphery of said center core part, having a refractive index lower than that of said center core part, and
wherein said center core hart has a relative refractive index difference of 2.4% or more with reference to the refractive index of said cladding part.

54. An optical fiber having, as characteristics at a wavelength of 1550 nm,
a bending loss of 0.1 dB/km or less in a state wound at a diameter of 60 mm; and
a chromatic dispersion of less than −200 ps/nm/km,
wherein said dispersion-compensating optical fiber comprises a center core part extending along a predetermined axis and having a predetermined maximum refractive index, and a cladding part provided on an outer periphery of said center core part, having a refractive index lower than that of said center core part, and
wherein said center core part has a relative refractive index difference of 2.4% or more with reference to the refractive index of said cladding part.

55. An optical fiber comprising:
a center core part extending along a predetermined axis and having a predetermined maximum refractive index;
a first cladding part, provided on an outer periphery of said center core part, having a refractive index lower than that of said center core part;
a second cladding part, provided on an outer periphery of said first cladding part, having a refractive index higher than that of said first cladding part; and
a third cladding part, provided on an outer periphery of said second cladding part, having a refractive index lower than that of said second cladding part,
wherein said optical fiber has, as characteristics at a wavelength of 1550 nm, a chromatic dispersion of −50 ps/nm/km or less; and a bending loss of 0.1 dB/km or less in a state wound at a diameter of 60 mm,
wherein said second cladding part has a relative refractive index difference of 0.2% to 0.9% with reference to the refractive index of said third cladding part, and
wherein said center core part has a relative refractive index difference of 2.4% or more with reference to the refractive index of said third cladding part.

56. An optical fiber according to claim 55, wherein said center core part has a relative refractive index difference of 2.4% to 4.0% with reference to the refractive index of said third cladding part; and
wherein said first cladding part has a relative refractive index difference of −0.9% to −0.2% with reference to the refractive index of said third cladding part.

57. An optical fiber according to claim 56,
wherein said optical fiber satisfies the following conditions:

$$0.2 \leq a/c < 0.4, \text{and}$$

$$0.4 \leq b/c \leq 0.8$$

where a is the outer radius of said center core region, b is the outer radius of said first cladding part, and c is the outer radius of said second cladding part.

58. An optical fiber according to claim 55, wherein chromatic dispersion changes by ±12% at a wavelength of 1550 nm or less when the outer diameter of said second cladding part changes by ±2%.

59. An optical fiber comprising:
a center core part extending along a predetermined axis and having a predetermined maximum refractive index;
a first cladding part, provided on an outer periphery of said center core part, having a refractive index lower than that of said center core part;
a second cladding part, provided on an outer periphery of said first cladding part, having a refractive index higher than that of said first cladding part; and
a third cladding part, provided on an outer periphery of said second cladding part, having a refractive index lower than that of said second cladding part,
wherein said optical fiber has, as characteristics at a wavelength of 1550 nm, a chromatic dispersion of −150 ps/nm/km or less, a bending loss of 0.01 dB/km or less in a state wound at a diameter of 60 mm, and an effective area of 20 μm$^2$ or less,
wherein said second cladding part has a relative refractive index difference of 0.2% to 0.9% with reference to the refractive index of said third cladding part, and
wherein said center core part has a relative refractive index difference of 2.4% or more with reference to the refractive index of said third cladding part.

\* \* \* \* \*